March 31, 1953 D. H. RING 2,633,492

GUIDED WAVE FREQUENCY RANGE, FREQUENCY SELECTIVE AND EQUALIZING STRUCTURE

Filed Dec. 30, 1948 6 Sheets-Sheet 1

INVENTOR
D. H. RING
BY
H. O. Wright
ATTORNEY

INVENTOR
D. H. RING
BY H. O. Wright
ATTORNEY

INVENTOR
D. H. RING
BY
H. O. Wright
ATTORNEY

INVENTOR
D. H. RING
BY
H. O. Wright
ATTORNEY

INVENTOR
D. H. RING
BY
H. O. Wright
ATTORNEY

March 31, 1953 D. H. RING 2,633,492

GUIDED WAVE FREQUENCY RANGE, FREQUENCY SELECTIVE AND EQUALIZING STRUCTURE

Filed Dec. 30, 1948 6 Sheets-Sheet 6

INVENTOR
D. H. RING
BY
H. O. Wright
ATTORNEY

Patented Mar. 31, 1953 2,633,492

UNITED STATES PATENT OFFICE 2,633,492

GUIDED WAVE FREQUENCY RANGE, FREQUENCY SELECTIVE AND EQUALIZING STRUCTURE

Douglas H. Ring, Red Bank, N. J., assignor to Bell Telephone Laboratories, Incorporated, New York, N. Y., a corporation of New York Application December 30, 1948, Serial No. 68,361

20 Claims. (Cl. 178—44)

This invention relates to "guided wave frequency range" transmission systems and apparatus. More particularly it relates to novel methods of and arrangements for determining the frequency selectivity and improving the attenuation and delay characteristics of such systems and apparatus. Devices of the invention include "guided wave frequency range" delay equalizing structures, amplitude equalizing structures and frequency selecting or filtering structures and systems employing such structures.

Full and complete exploitation of the guided wave frequency range or spectrum (i. e. the frequency region extending from about 30 megacycles upwards) can be realized only when adequate frequency selective and equalizing devices of convenient and readily realizable character are made available and have been demonstrated feasible.

The "guided wave frequency range" is to be understood, for the purpose of this application and in the appended claims, to be that range of frequencies in which either coaxial transmission lines or single conductor "wave-guide" transmission lines or combinations of these two types of transmission lines are, conveniently, employed. This range extends from about 30 megacycles upward to the highest frequencies which can at present be employed in electrical systems.

Accordingly, the principal objects of this invention are to provide convenient and practicable novel frequency selective and equalizing devices for use in "guided wave frequency range" transmission systems.

Other objects of the invention are to provide novel structures comprising combinations of wave-guide or coaxial line devices and structures associated and arranged to constitute wave filters, phase equalizers and atenuation equalizers at very high frequencies.

A further object is to provide circuit arrangements in which greater convenience in the use of the frequency selective or equalizing devices of the invention is realized.

Other and further objects will become apparent during the course of the description of specific illustrative structures given hereinafter and from the appended claims.

Since the practicable realization of sources of adequate microwave radio energy (i. e., radio energy having frequencies from 1,000 megacycles upward) it has become imperative to find very high frequency equivalents of the lumped element types of frequency selective circuits and amplitude equalizing and delay equalizing devices commonly employed at lower frequencies.

The lumped element circuits and devices, of course, comprise various combinations of discrete inductive, capacitative and resistive elements, proportioned and arranged in accordance with well-known, highly developed, coordinated and systematized principles. By way of illustration, many of these principles are summarized and briefly discussed in the "Radio Engineers Handbook" by F. E. Terman, first edition, McGraw-Hill Book Company, Incorporated, New York city, 1943, pages 197 to 251, inclusive. The main authoritative publications in this art are referred to in Terman's Handbook.

In the case of the present invention various novel guided wave frequency range structures are disclosed which are strikingly different in physical appearance and mechanical structure from the approximately equivalent lower frequency lumped element structures.

For example, many of the characteristics of the "hybrid-coil" can be identified as being analogous to those of the so-called "magic T," the four terminal wave-guide ring known in the art as the "rat race," the four terminal coaxial ring and other "hybrid" coaxial line and wave-guide junction structures. Wave-guide hybrid junctions and wave-guide hybrid rings of a number of types are discussed in detail in an article entitled "Hybrid Circuits for Microwaves" by W. A. Tyrrell in the Proceedings of the I. R. E. for November 1947.

As will be presently demonstrated, the "hybrid-coil," taken with appropriate terminating impedances associated with two of its branches, has many characteristics similar to those of the lattice structure.

The lattice structure is one of the most general types of lumped element electrical networks and can readily be designed in accordance with principles, universally known in the art, to provide virtually any physically realizable impedance, phase or attenuation characteristics which may be desired. (See for example, the papers entitled, "A General Theory of Electric Wave Filters" by H. W. Bode, published in the Massachusetts Institute of Technology Journal of Mathematics and Physics, November 1934 and "Ideal Wave Filters" by H. W. Bode and R. L. Dietzold, published in the Bell System Technical Journal, volume 14, No. 2, April 1935 at page 215. Of interest in this connection, also, is much of the material contained in H. W. Bode's book entitled "Network Analysis and Feedback Amplifier Design," published by D. Van Nostrand Company, Inc., New York, N. Y. in 1945.)

A widely used class of amplitude or attenuation equalizers is described in detail in the book entitled, "Transmission Circuits for Telephonic Communication" by K. S. Johnson, published by D. Van Nostrand Company, Inc., New York, N. Y. 1929 (fourth printing) chapter XVIII, pages 229 to 238. A lattice structure of this type is shown in Fig. 1E thereof. (See, also, pages 244 to 249 of Terman's above-mentioned Radio Engineer's Handbook.) Low frequency equalizers require resistive elements, as well as inductive and capacitative ones.

At very high and microwave frequencies, resistive effects are obtained by inserting at appropriate high energy positions in the resonant cavities and transmission lines, dielectric cards coated with carbon particles and by a number of similar devices well-known to those skilled in the art. By way of example, Patents 2,151,157 granted March 17, 1939, to S. A. Schelkunoff and 2,197,123, granted April 16, 1940 to A. P. King illustrate a number of ways of introducing resistive effects in wave-guide structures and are directed particularly to wave-guide attenuators. Similarly the introduction of resistive effects into coaxial structures is illustrated in numerous figures of reissued Patent 20,859, granted September 13, 1938 to R. K. Potter.

Structures will be described hereinafter, which will function at high, ultra-high and microwave frequencies, i. e., in the "guided wave frequency range," as electrical wave filters and equalizers in a manner similar to that of the well-known lumped element lattice and related structures at much lower frequencies. Applicant's invention thus provides a key to a whole gamut of high frequency, ultra-high frequency and microwave ("guided wave frequency range") equivalents of the lower frequency, lumped element, lattice type and related structures.

Some applications of certain of the devices of the present invention in specific form, are described and illustrated in the copending applications of W. D. Lewis, Serial No. 789,985 and A. G. Fox, Serial No. 789,812, both of which were filed on December 5, 1947, and both of which are assigned to applicant's assignee. The Lewis application matured into United States Patent 2,531,447 and the Fox application into United States Patent 2,531,419, both of which patents were granted on November 28, 1950.

In the usual over-all microwave radio transmission system, now well-known to those skilled in the art (see for example, the article entitled "Microwave Repeater Research" by H. T. Friis in the Bell System Technical Journal, volume XXVII, No. 2, April 1948, pages 183 to 246, inclusive) it has been found convenient to effect transmission over long distance by interposing, between the terminal stations, a sufficient number of repeater stations so that the actual transmission links (i. e., the intervals between each terminal station and the nearest repeater station or between successive repeater stations) are usually in the order of 25 to 50 miles in length.

This results in a substantial number of repeater stations in instances where the terminal stations of a system are separated by a distance of, for example, a thousand miles or more. For this reason, relatively slight imperfections in the transmission characteristics of the repeater and terminal station apparatus can, by cumulative effect, produce disturbing phenomena of a character not usually encountered in radio transmission systems. One such disturbing phenomenon, in long distance microwave radio relay systems, has been found to be objectionable distortion in the transient response of the system arising from irregularities and disparities in the cumulative delay caused by the apparatus at different frequencies within the transmission channels (or frequency bands) of the system. Equalization to overcome, or compensate for, the delay irregularities and disparities by means disclosed in this application was found to be very effective. The same principles and at least analogous structures can, as will become apparent hereinafter, be employed in coaxial and wave-guide transmission systems.

The nature and principles of the invention will be more readily understood in connection with the following detailed description of specific illustrative arrangements and from the accompanying drawings, in which.

Figures 5, 6, 7, 8, 9, 10, 11:
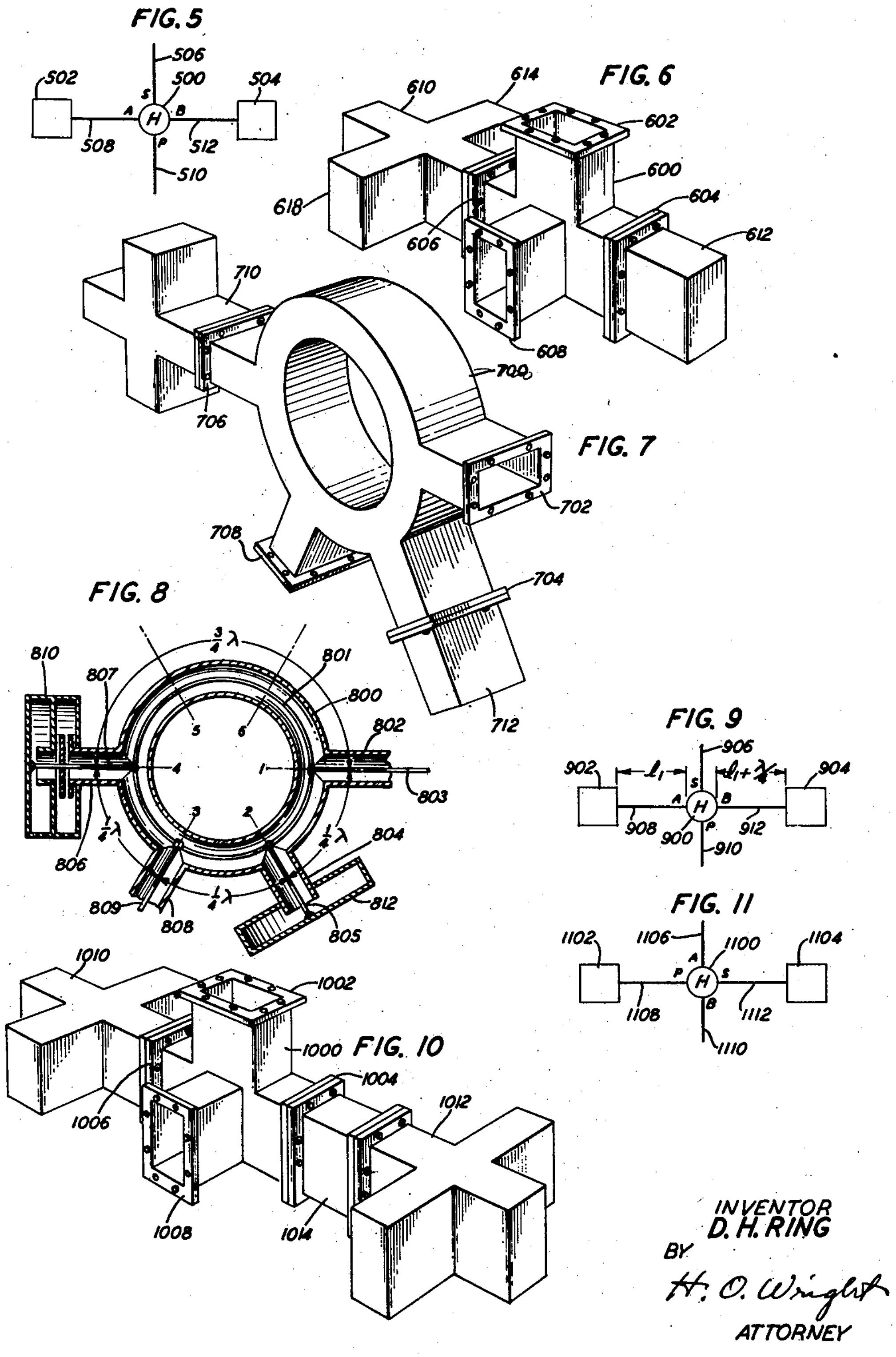
Figure 12:
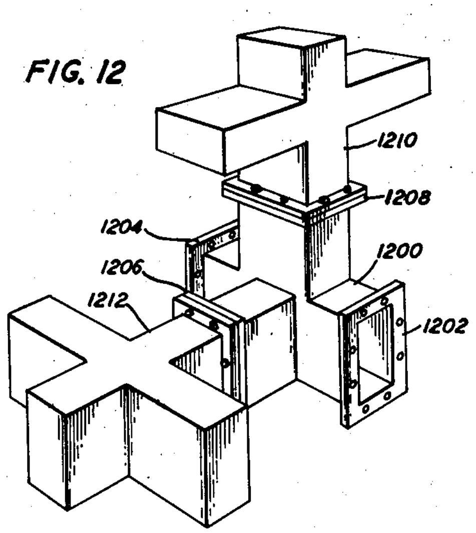
Figure 13:
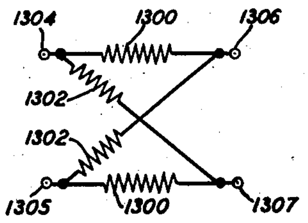
Figure 14:
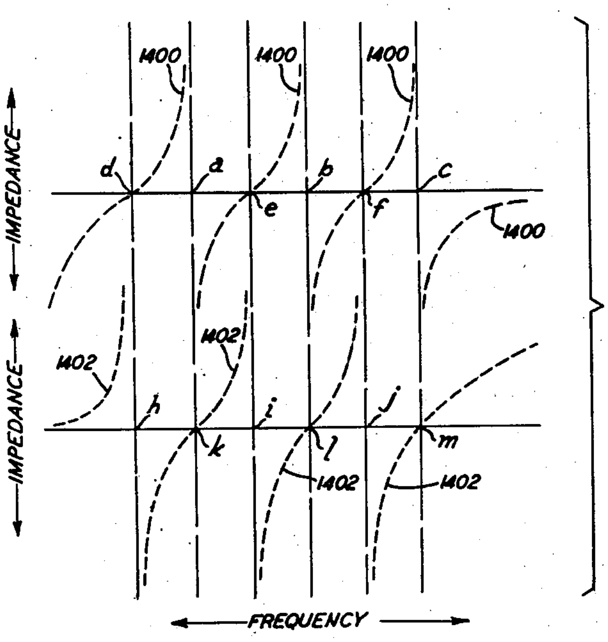
Figure 15:
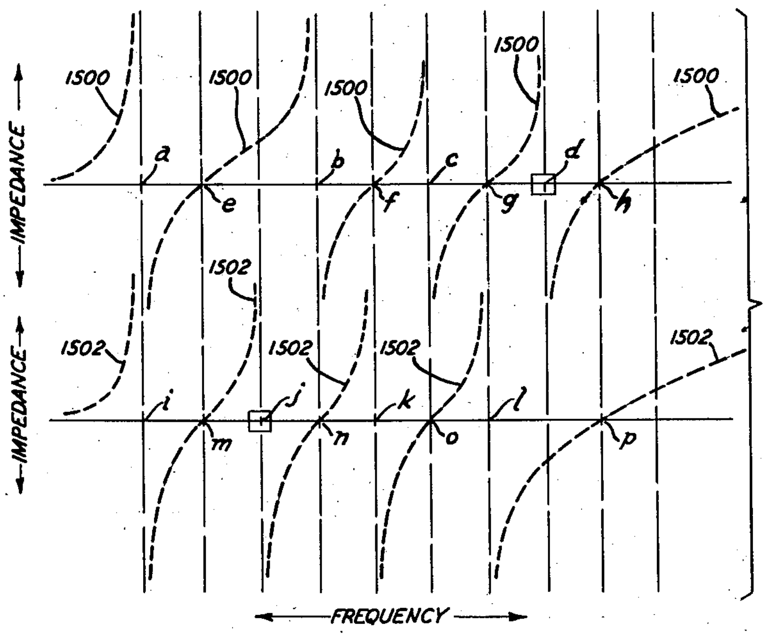
Figure 16:
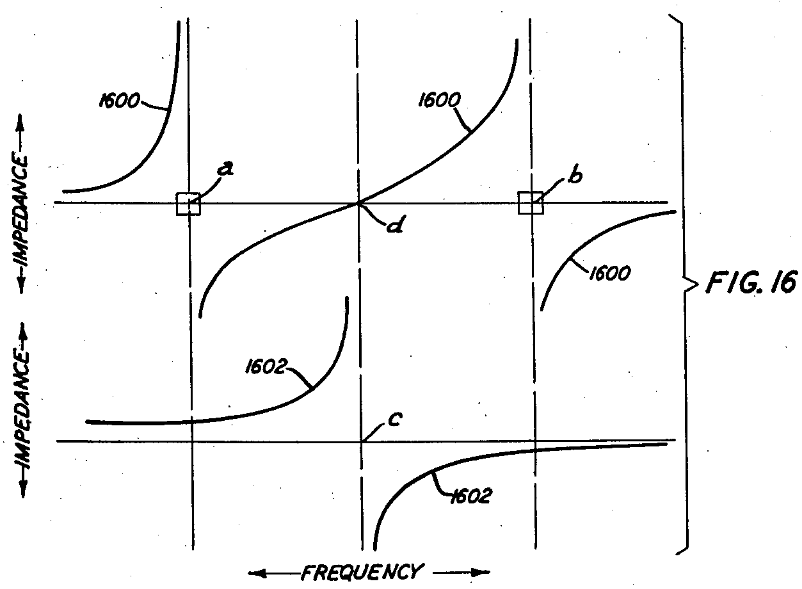
Figure 17:
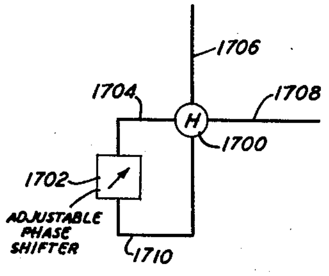
Figure 18:
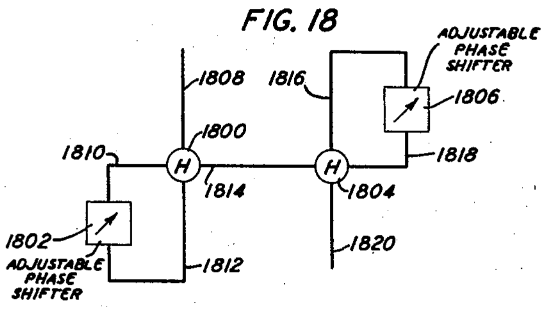
Figures 19, 20, 21:
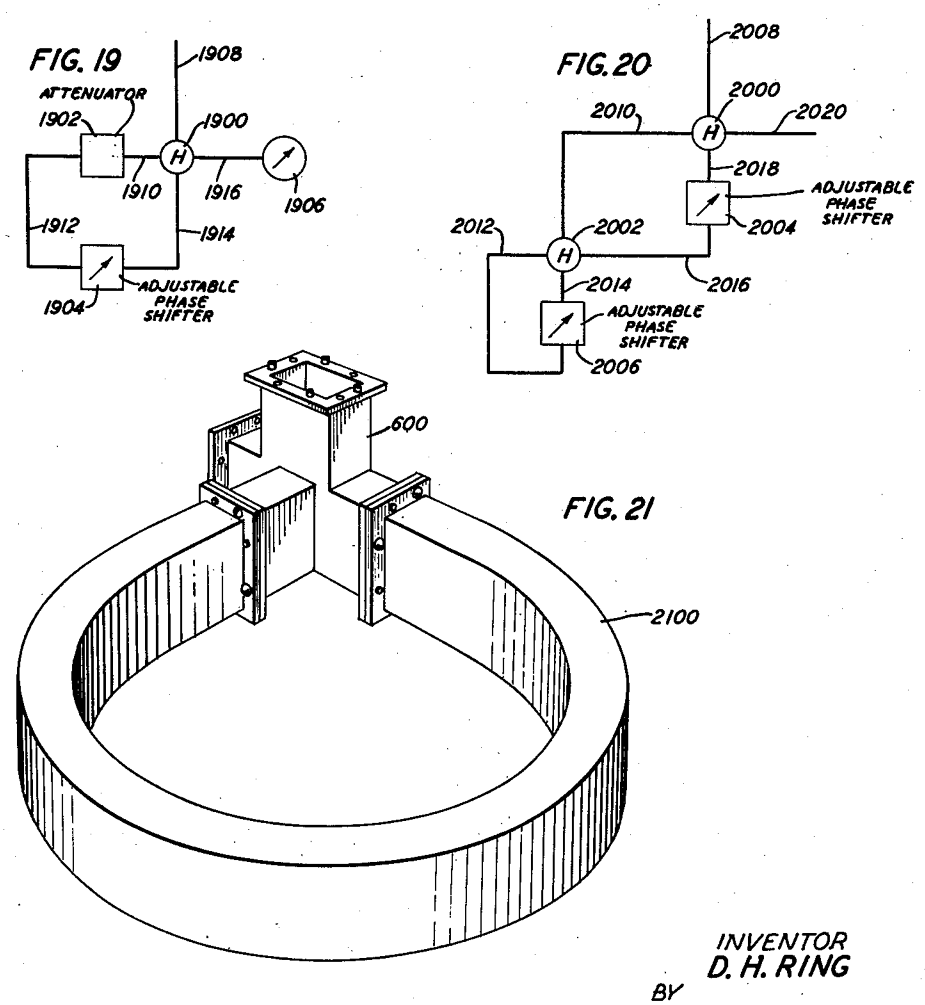

Fig. 5 shows, in electrical block schematic diagram form, a combination of the invention which can be readily proportioned to provide, in the "guided wave frequency range," frequency selective (wave filter), attenuation or phase equalizing or phase delay characteristics comparable to the characteristics, at relatively low frequencies, of the corresponding forms of the well-known lumped element lattice type of structure;

Fig. 6 illustrates the combination of a wave-guide hybrid junction, or "magic T," with wave-guide impedance devices to provide one form of combination of the invention of the general type shown in Fig. 5;

Fig. 7 illustrates the combination of a wave-guide hybrid ring, or "rat-race" with wave-guide impedance devices to provide another form of combination of the invention of the general type shown in Fig. 5;

Fig. 8 illustrates the combination of a coaxial hybrid ring with coaxial impedance devices to provide still another form of combination of the invention of the general type shown in Fig. 5;

Fig. 9 shows, in electrical block schematic diagram form, a rearrangement of the combination of Fig. 5 particularly suited for use, at microwave frequencies, as an amplitude equalizing or as a delay equalizing device;

Fig. 10 illustrates a combination of wave-guide structures comprising a "magic T," or wave-guide hybrid junction, a quarter wave section of wave guide and two multiply-resonant wave-guide devices assembled to form a combination of the invention of the general type shown in Fig. 9;

Fig. 11 illustrates, in block schematic diagram form, a further general type of combination of the invention similar to those of Figs. 5 and 9 except that the arms A and B of the hybrid junction are employed as the input and output terminals;

Fig. 12 illustrates a combination of wave-guide devices similar to that shown in Fig. 10 but with the resonant structures assembled on the P and S arms of the hybrid junction in accordance with the schematic diagram of Fig. 11;

Fig. 13 shows, in electrical schematic diagram form, a conventional lumped element lattice type structure which is utilized hereinunder in explaining the operation of combinations of the invention such as those shown in Figs. 5 to 12, inclusive;

Fig. 14 is a diagram of the impedance characteristics of two reactive devices which can be associated with a hybrid junction to provide an all-pass, phase or amplitude distortion equalizing structure in accordance with the principles of the invention;

Fig. 15 is a diagram of the impedance characteristics of two reactive devices which can be associated with a hybrid junction to provide a band-pass wave filter structure in accordance with the principles of the invention;

Fig. 16 is a diagram similar to that of Fig. 15 but involving more simple reactive devices;

Fig. 17 shows, in electrical block schematic diagram form, the combination of a hybrid structure with a single reactive element which can readily be proportioned to provide at microwave frequencies phase delay characteristics appropriate for use in systems of the invention;

Fig. 18 shows a combination of two arrangements of the type shown in Fig. 17 connected in tandem or sequence;

Fig. 19 shows a structure of the general type illustrated in Fig. 17 rearranged to provide a frequency indicating circuit;

Fig. 20 shows an alternative way of utilizing two devices of the type shown in Fig. 17; and Figs. 21 to 23, inclusive, represent assemblies of actual wave-guide structures embodying the principles explained in connection with the block schematic diagrams of Figs. 17 and 19.

Figure 1:
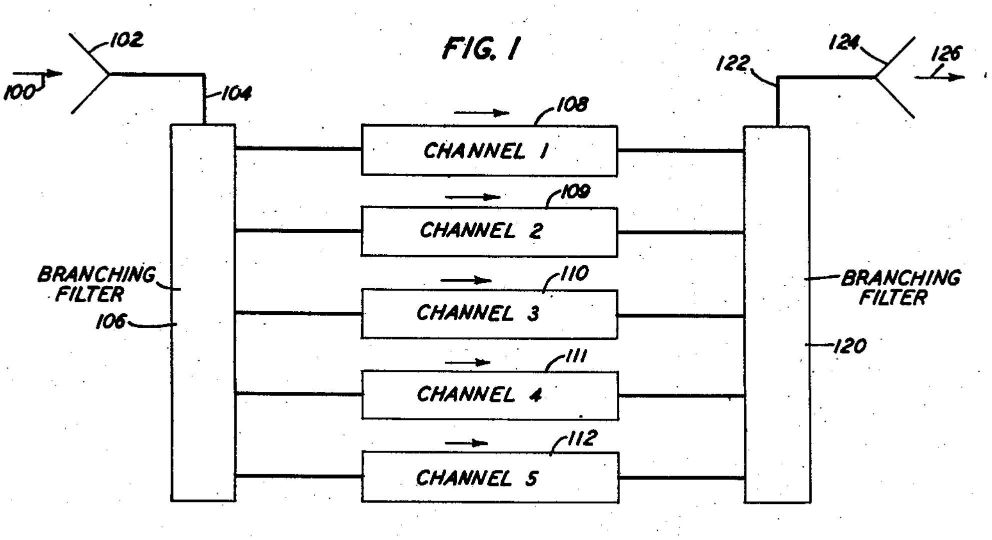
Fig. 1 shows, in electrical block schematic diagram form, an illustrative type of a multichannel microwave repeater, for one direction of transmission, in which devices and features of the invention can be incorporated.

In more detail, in Fig. 1 a portion of a microwave radio repeater station is illustrated in schematic diagram form. This portion comprises five channels, as shown, in which the direction of transmission is the same (from left to right as shown in Fig. 1). The usual complete repeater system would normally also include an equal number of channels transmitting in the opposite direction, as illustrated, for example, in Fig. IV-1 at page 211 of the above-mentioned article entitled "Microwave Repeater Research" by H. T. Friis. Fig. II-1 on page 199 of the Friis article illustrates a microwave radio repeater circuit having "n" links and transmitting in one direction only. Two such circuits transmitting in opposite directions between the terminals constitute a complete system. The principles of the invention, as developed hereinunder in connection with Fig. 1, are, as will become evident, directly applicable to corresponding portions of the entire circuit. A portion only of an entire circuit is shown in Fig. 1 to avoid needless complication of the figure.

The assignment of channel frequencies in Fig. 1 can be, for example, as shown in Fig. IV-1 of the Friis article, i. e. 20-megacycle bands of frequencies centered about the mid-band frequencies of 3830, 3910, 3990, 4070 and 4150 megacycles, for channels 5, 4, 3, 2 and 1 (designated 112, 111, 110, 109 and 108) respectively.

Antennas 102 and 124 are highly directive radio antennas, preferably of the type described in detail under the heading entitled "III Antenna Research" of the above-mentioned Bell System Technical Journal, article at pages 201 to 210, and illustrated specifically in Fig. III-4 at page 205 of said article. This type of antenna is also described in the Proceedings of the Institute of Radio Engineers, volume 34 for November 1946 at page 828. A number of alternative forms of antennas which can also be used are described in the above-mentioned Friis article. A further alternative form is described and claimed in the copending application of W. E. Kock, Serial No. 748,448, filed May 16, 1947 and assigned to applicant's assignee. This application matured as United States Patent 2,577,619 granted December 4, 1951.

The branching filters 106 and 120 are preferably of the type described and claimed in the above-mentioned copending application of W. D. Lewis. This type of branching filter is also illustrated in Fig. IV-7 at page 216 and described on pages 212 to 219, inclusive, of the above-mentioned article by Friis in the Bell System Technical Journal.

The range of frequencies received by antenna 102 is transmitted by wave guide 104 to the compound or composite hybrid branching microwave filter 106.

The cut-off of the wave guide 104 and of all wave guides employed throughout the whole microwave system should be well below the lowest frequency to be transmitted, to avoid the introduction of substantial and non-uniform attenuation in the wave guides as well as to aviod introducing disturbing impedance and phase components. As is a common and convenient practice in the art, wave guides of rectangular cross-section having one cross-sectional dimension larger than the other can, preferably, be employed in the illustrative structures shown in the drawings. A simple mode of wave, defined in Schelkunoff's book cited below, can also, preferably, be employed. The shorter dimension of the wave guide will be referred to as the E-plane dimension. The longer dimension of the wave guide will be referred to as the H-plane dimension. The E-plane and H-plane are of course the planes in which the electric and magnetic vectors are located, respectively, when waves of the above-mentioned type are being propagated through the guide.

It should be understood that the specific type of wave guide just described is employed merely as a convenient illustrative type and that the principles of the invention can readily be applied to systems and arrangements using square or round wave guides, or wave guides of other cross-sectional shapes, or coaxial line structures, as will be readily apparent to those skilled in the art.

By way of a more specific example, for the frequency range above-mentioned, i. e. in the vicinity of 4000 megacycles, a rectangular wave guide having a height of 2.290 inches (H-plane) and a width of 1.145 inches (E-plane), internal cross-sectional dimensions, was found suitable. The cut-off frequency of this wave guide is approximately 2600 megacycles.

In the wave-guide structures of rectangular cross section, employed in connection with this application for illustrative purposes, fundamental mode waves $E_{1,0}$ (see page 316 of "Electromagnetic Waves" by S. A. Schelkunoff, published by D. Van Nostrand Company, Incorporated, New York, N. Y., 1943) are to be understood as being employed in the operation of the structures, the electric vector being parallel to the shorter side of the guide.

It is also to be understood that, throughout the application, drawings and claims, when specific lengths of wave-guide structures are mentioned in terms of a portion of a wavelength, the wavelength of a particular frequency when being transmitted through the structure being described is intended. Usually the median frequency of the frequency range, or of a particular channel or band of frequencies, of immediate interest, is employed to provide the "yardstick" wavelength in specific instances.

In Fig. 1, the filters 106 and 120 can, as is mentioned above, preferably be hybrid branching filters of the type described in the above-mentioned sole application of W. D. Lewis, the specific arrangement to be used being chosen to best suit the requirements of the system being assembled. It will suffice here to state, simply, that these filters function to segregate each of the several communication channels, so that, for example, frequencies in the band having its mid-frequency at 4150 megacycles will alone be transmitted to the upper repeater circuit, channel 1 of Fig. 1, and the band centered about 4070 megacycles will alone be transmitted to the second repeater circuit, channel 2 of Fig. 1, etc., by filter 106.

Filter 120 serves to prevent the frequencies of any of the five channels from being introduced into any other channel and permits frequencies of all channels to be freely transmitted through wave-guide 122 to the outgoing antenna 124.

As explained on pages 220 to 223, inclusive, of the Friis article, difficulties arising from unwanted feedback in each repeater channel can be substantially eliminated by a small shift in the outgoing radio frequency of each channel with respect to the incoming radio frequency of the channel. This is illustrated in the Fig. V-2 on page 221 of the Friis article. Circuits for effecting this small shift in frequency are shown in Figs. V-1 and V-3 on pages 220 and 222, respectively, of the Friis article and in Fig. 2 of the drawings accompanying this application. The channels passed by branching filter 120 and radiated from antenna 124 will, accordingly, be shifted by a small amount in frequency from those received by antenna 102 and passed by branching filter 106. By way of example, for 20 megacycle channels centered about midfrequencies in the neighborhood of 4000 megacycles a shift of 40 megacycles has been found to effect the desired substantial elimination of difficulties arising from feedback in the repeater circuit. In a typical case, therefore, the bands transmitted by filter 120 will be displaced by an interval of 40 megacycles in one or the other direction from the corresponding channels of filter 106, respectively.

Figure 2:
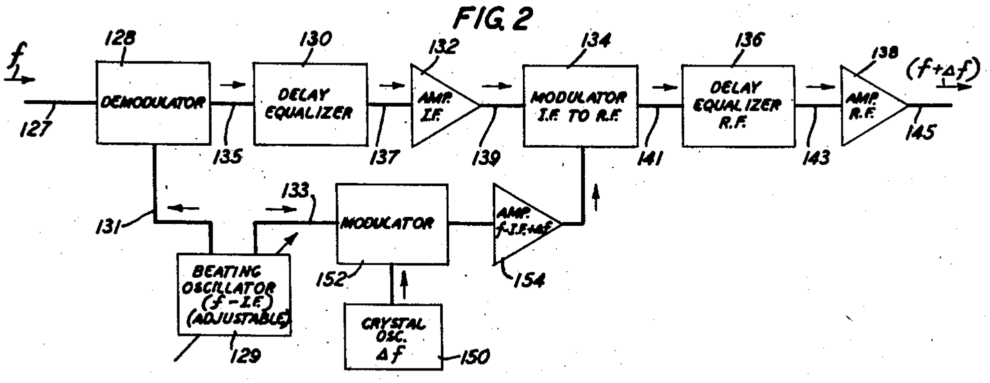
Fig. 2 shows, in electrical block schematic diagram form, the arrangement of apparatus employed in a typical channel of the system of Fig. 1.

In Fig. 2 of the drawings accompanying this application, the apparatus and circuit arrangement of a typical specific repeater channel is illustrated in block schematic form.

Line 127 is a wave guide connecting demodulator 128 with the branch of the hybrid branching filter 106 of Fig. 1 which branches off the band of frequencies to be amplified in the particular channel being considered.

Beating oscillator 129 provides an appropriate frequency through wave guide 131, so that when combined with the radio frequencies (R. F.) arriving through wave guide 127, and I. F. (intermediate frequency) band of 20 megacycles centered about a frequency of approximately 70 megacycles will result. For reasons which will be explained in detail hereinunder, the frequency of the beating oscillator is made adjustable within a range of several megacycles each side of the value which would produce a band centered about 70 megacycles.

Demodulator 128 is preferably of the crystal detector type well-known in the art. It is sometimes referred to as a "receiving converter." One suitable form it may take is that shown in Fig. V-4 on page 225 and described on pages 224 to 226, inclusive, of the above-mentioned Friis article. This and alternative forms of converters are described in detail in a paper entitled "Microwave Converters" by C. F. Edwards, published in the Proceedings of the Institute of Radio Engineers, volume 35, No. 11, pages 1181 to 1191, inclusive, November 1947.

The output of demodulator 128 is connected by coaxial line 135 to delay equalizer 130 and from equalizer 130 by coaxial line 137 to I. F. amplifier 132. Equalizer 130 and amplifier 132 can be of conventional design. Alternatively equalizer 130 can be a combination of a hybrid structure of the coaxial ring type with appropriately chosen impedances, or a single impedance, associated with two terminals of the hybrid ring, as will be described in detail hereinunder. The special problems involved in the design of a suitable form for the amplifier 132 are discussed in the above-mentioned article by Friis on pages 226 to 231, inclusive. As described in the Friis article, it is often advantageous to build the I. F. amplifier in two sections. One section is then designated as the I. F. preamplifier and is closely associated with the modulator. If used, it is interposed between modulator 128 and equalizer 130. The other section is usually called the main I. F. amplifier and follows the delay equalizer as indicated in Fig. 2. To avoid a further complexity, not necessary to illustrate the principles of the present invention, no I. F. preamplifier is shown in Fig. 2. It should be understood, however that it can be and usually is employed.

The output of amplifier 132 is transmitted through coaxial line 139 to modulator 134. This modulator is sometimes referred to as a "Transmitting Converter" and its function is to modulate the amplifier I. F. signal back to an appropriate radio frequency. Where no change of frequency between the incoming radio frequency $f$ to modulator 128 and the outgoing radio frequency from modulator 134 to radio frequency amplifier 138 is desired the frequency ($f$—I. F.) from the beating oscillator 129 can be supplied directly to the modulator 134. However, as mentioned above, difficulties arising from feedback from the output to the input of the over-all repeater circuit are frequently encountered with such arrangements. These difficulties are avoided by the use of an additional modulator 152 and a crystal or other highly stable oscillator 150. Oscillator 150 provides an appropriate frequency $\Delta f$ (40 megacycles, by way of example, as was previously mentioned above) which is combined with the frequency ($f$—I. F.) of the beating oscillator 129. The resulting frequency ($f$—I. F.+$\Delta f$) is then amplified in amplifier 154 and furnished in modulator 134. The output frequency of modulator 134 is then ($f+\Delta f$) and differs sufficiently from the input radio frequency $f$ that no substantial feedback difficulties are encountered. The output of modulator 134 is passed through wave guide 141, radio frequency delay equalizer 136 and wave guide 143 to radio frequency amplifier 138 and thence through branching filter 120 and wave guide 122 of Fig. 1 to antenna 124.

Equalizers 130 and 136, by their combined action, reduce delay distortion arising in both the radio frequency and intermediate frequency portions of the system to negligible proportions. One or the other of these equalizers can in many instances be omitted and the remaining equalizer can then be designed to provide equalization for both radio frequency and intermediate frequency delay distortion. This may, under some circumstances however, result in a complicated design problem and a relatively expensive equalizer, in which case the use of two equalizers as shown may prove preferable from the standpoint of the costs of manufacture, adjustment and/or maintenance.

With respect to equalizer 130, when used to compensate for part or all of the radio frequency delay distortion the circuit arrangement shown in Fig. 2 permits precise adjustment of the intermediate frequency band to the equalizer characteristic so as to best fit the delay distortion characteristic of the radio frequency circuit by simply adjusting the frequency of the beating oscillator 129. From the arrangement of the circuit it is obvious that changing the beating oscillator frequency will not affect the output frequency $f+\Delta f$ since the I. F. frequency is cancelled out by the action of modulator 134 as described in detail above. The result is therefore merely to raise or lower the frequency of the intermediate frequency band (I. F.). Obviously, the beating oscillator frequency should consequently be adjusted until the radio frequency delay distortion is a minimum, i. e. until the characteristic of the equalizer most closely compensates for the delay distortion of its associated radio frequency circuit.

The following numerical example illustrates one way of employing the method of adjustment of the frequencies as described above for a repeater circuit of Fig. 2. It is assumed, for example, that the incoming frequency is 3830 megacycles. To obtain an intermediate frequency (I. F.) of 70 megacycles, beating oscillator 129 is adjusted to 3830–70 or 3760 megacycles. If $\Delta f$ is made 40 megacycles, as mentioned above, then modulator 152 and amplifier 154 furnish modulator 134 with the frequency 3760+40=3800 megacycles and the output frequency is $f$—I. F.+$\Delta f$+I. F.=3830—70+40+70=3870 megacycles. Suppose, however, that in order to fit the characteristic of equalizer 130 better it is necessary to shift the I. F. band by 1 megacycle so that the band is centered about 71 megacycles. This means that the frequency of beating oscillator 129 should be decreased by 1 megacycle to 3759 megacycles. With $\Delta f$ of oscillator 150 still at 40 megacycles we now have from modulator 152 and amplifier 154 to modulator 134 a frequency of $f$—I. F.+$\Delta f$=3830—71+40=3799 megacycles and the output frequency is 3799+71=3870 megacycles, as before. Obviously, such adjustments of the frequency of beating oscillator 129 do not change the output frequency of modulator 134.

Figure 3:
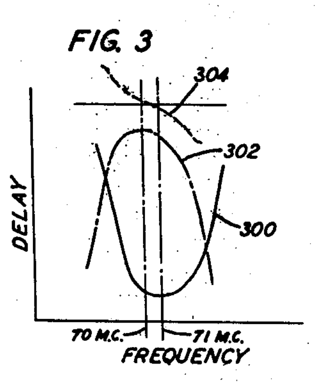
Figs. 3 and 4 illustrate graphically the method of improving the match of a delay equalizer characteristic to the delay characteristic of its associated circuit based upon slightly shifting the intermediate frequency in a circuit of the type illustrated in Fig. 2.

The adjustment of the intermediate frequency band to better fit the radio frequency delay distortion to the equalizer characteristic in the manner described above is illustrated by the curves of Figs. 3 and 4. Curves 302 and 402 represent the equalizer characteristic in Figs. 3 and 4, respectively. Curve 300 of Fig. 3 represents the radio frequency delay distortion characteristic of the 20 megacycle band when centered about 70 megacycles. Curve 400 of Fig. 4 represents the radio frequency delay distortion characteristic shifted so as to be centered about 71 megacycles.

Figure 4:
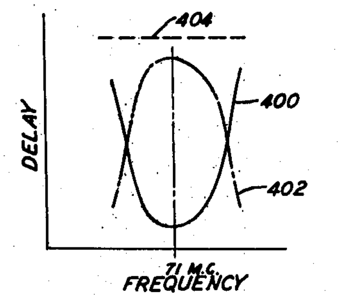

Curves 304 and 404 represent the equalized radio frequency characteristic of the circuit for the two conditions represented by Figs. 3 and 4, respectively. Delay distortion introduced by the intermediate frequency circuit is of course equalized in the usual way by adjustment of the equalizer elements. Obviously, the "fit" between the equalizer and the radio frequency delay distortion characteristics has been substantially improved by the shifting of the 20-megacycle band as evidenced by the improved linearity and "flatness" or uniformity of curve 404 as compared with curve 304. Conversely, where radio frequency equalizer 136 is employed to equalize a part or all of the intermediate frequency delay distortion the beating oscillator frequency can be varied to effect the best fit of the equalizer characteristic to the intermediate frequency delay distortion. Obviously the same method is applicable to the solution of problems of fitting attenuation equalizer characteristics or even wave filter transmission characteristics to obtain more nearly linear or flat overall characteristics for the repeater channel.

In Fig. 5 hybrid structure 500 can be a structure of the so-called "magic T" type (wave-guide hybrid junction) or, alternatively, with certain modifications to be described in detail hereinafter, it can be of the "rat-race" (wave-guide, coaxial or other transmission line hybrid loop structure) type, many forms of which are illustrated and described, for example, in the copending application of W. A. Tyrrell, Serial No. 470,810, filed December 31, 1942 which matured into Patent 2,445,895 granted July 27, 1948. The disclosure of Tyrrell's application is reproduced in part and that part discussed at length in his paper "Hybrid Circuits for Microwaves" published in the Proceedings of the Institute of Radio Engineers, volume 35, for November 1947, pages 1294 to 1306, inclusive. As a further alternative, in some instances, the improved type of microwave hybrid junction, disclosed and described in the above-mentioned application of W. D. Lewis, and designed particularly for use with the hybrid branching filters of the Lewis application, can be employed as a component of the arrangement of Fig. 5.

Whatever form of "hybrid" structure is employed, it should have four terminals, associated in two pairs, each terminal of a pair being conjugately related to the other terminal of the same pair.

In the case of the wave-guide "magic T" hybrid junction, for the two terminals comprising at least one pair, for convenience here designated the first pair, one terminal will be a "parallel" connection to the second pair and the other will be a "series" connection to the second pair. The terminals of the first pair will be designated "P" and "S," respectively, and the terminals of the second pair will be designated "A" and "B," respectively, throughout the following description and in the figures of the accompanying drawings where wave-guide "magic T" hybrid junctions are to be employed. Furthermore, it is to be understood that the inherent properties of the hybrid structure require that if the voltage wave energy is introduced into the structure from either terminal of the first pair, with the other three terminals connected to impedances which match their respective input impedances, no energy will leave the structure by the other terminal of that pair, but the energy introduced will divide equally between the second pair of the terminals "A" and "B" of the hybrid structure. The impedances of the circuits connected to all four terminals of the hybrid structure should, in every instance, substantially match the impedances of the respective terminals to which they are connected to insure a proper balance of the combination.

If in the case of the "magic T" type of junction the energy is introduced by the "parallel" connection, terminal "P" of the first pair, the voltage waves resulting therefrom in terminals "A" and "B," of the second pair will be in phase. If the energy is introduced by the "series" connected terminal "S," of the first pair, the voltage waves (representing the halves of the energy), resulting therefrom in each of the second pair of terminals "A" and "B," will be 180 degrees out of phase. This simply means that for the "hybrid T" wave-guide junction, that the two conjugate pairs are so related electrically, that one terminal "P" of the first pair is effectively electrically in parallel with the terminals "A" and "B" of the second pair, while the second terminal "S" of the first pair is effectively electrically in series with the terminals "A" and "B" of the second pair.

Conversely, if equal wave energies are introduced, in phase, to the two terminals "A" and "B" of the second pair they will combine in the parallel connected terminal "P" of the first pair, no voltage wave energy being transmitted to the series connected terminal "S."

If equal voltage wave energies, 180 degrees out of phase, are introduced into the two terminals "A" and "B" of the second pair, the voltage wave energies will combine in the series connected terminal "S" of the first pair, no voltage wave energy being transmitted to the parallel connected terminal "P."

Obviously, any multiple of 360 degrees phase difference can be added to the "in phase" or "out of phase" conditions, just described above, without affecting the terminal ("P" or "S," respectively) in which the equal energies, applied to the terminals "A" and "B," will combine. The matter of additional whole cycles (i. e., multiples of 360 degrees phase difference) is treated in more detail and described at length hereinafter. It is also obvious that, where equal energies are applied to the "A" and "B" terminals, changing the phase of the energy introduced into one only of these terminals by 180 degrees, or odd multiples thereof, will cause the combined energy to appear in the opposite one of the terminals "P" or "S" in which it would have appeared without such a change.

While the foregoing description has been specifically directed to the "magic T" type of hybrid junction, all guided wave frequency range hybrid structures have electrically equivalent A, B, P and S arms.

In Fig. 5, a wave-guide hybrid structure "H," designated 500, is shown, having its two pairs of conjugate terminals connected as indicated. The two terminals "A" and "B" of one pair are connected by lines 508 and 512 to their terminating impedances 502 and 504, respectively, the impedances being assumed, for the moment, to be identical and purely reactive.

In Figs. 5, 9, 11 and 17 through 20, inclusive, the symbol comprising a circle enclosing the capital letter H signifies a "guided wave frequency range" hybrid junction i. e. a "magic T" or wave-guide ring structure or a coaxial ring hybrid structure. Physical structures of the class represented by this symbol are, by way of illustration, junctions 600 of Fig. 6, 700 of Fig. 7, and 800 of Fig. 8. The four connections to the circular symbol, i. e., two vertical and two horizontal, represent the four terminals of the hybrid junction, the two vertical connections representing one conjugate pair of terminals and the two horizontal connections representing the second conjugate pair of terminals. The letters S, P, A and B represent specific terminals of the junction only when the "magic T" type of structure is employed. For other types of hybrid junctions the letters S and P can represent either pair of conjugate terminals and A and B then represent the other pair of conjugate terminals.

In Fig. 5 the free pair of conjugate terminals connect to the lines 506 and 510, respectively, either one of which can serve as an input and the other as an output line. These lines connect to the terminals S and P of the hybrid structure H, which terminals are effectively connected in series relation and in parallel relation, respectively, with reference to the other pair of conjugate terminals "A" and "B," as described in detail above, when a "magic T" type of hybrid junction is employed.

Assume that, in Fig. 5, a wave of frequency $f$ is introduced through line 506 and that line 510 is connected to a load circuit the impedance of which matches the impedance of terminal P of the microwave hybrid structure 500. From the inherent properties of "hybrid" structures, as described in detail above, it is obvious that this wave will divide into two voltage waves, each of half the power of the wave introduced through the line 506, these half power voltage waves entering the lines 508 and 512, respectively, and traveling toward the impedances 502 and 504, respectively. These half power voltage waves will be totally reflected by impedances 502 and 504, respectively, since the latter are, as mentioned above, purely reactive. The lines 508, 512 and the reactances 502 and 504, respectively, will, at the instants of reflection, have introduced effective phase changes of $\varphi_1(f)$, and $\varphi_2(f)$, respectively.

The effective change in phase, resulting from the reflection at a purely reactive termination, can be considered as the reflection from the end of a short-circuited transmission line of such length that the same change in phase or delay would have been introduced in the wave traveling to the point at which the short circuit is located. From this point of view, then, the reactive impedance can be considered as having introduced an effective short circuit at a discrete distance along an equivalent transmission line. Since the phase change introduced by the reactance is a function of frequency, i. e. varies with frequency, the reactance can be considered as "moving" the short circuit along the line in a prescribed manner as the frequency is varied.

In traveling back to the "hybrid" junction the reflected waves will undergo an equal change in phase so that they will arrive back at the hybrid structure 500 with phase changes $2\varphi_1(f)$ and $2\varphi_2(f)$, rsepectively. From the characteristics of a wave-guide hybrid structure, if the phase changes are equal or differ by an integral number of revolutins (or cycles), i. e. if $2\varphi_1=2\varphi_2\pm2\pi n$ (or if $\varphi_1-\varphi_2=0$ or $\pi n$, where $n$ is any whole number), the half power voltage waves will completely recombine in line 506 and the circuit of Fig. 3 will be totally reflecting, i. e. it will not transmit the frequency $f$ to line 510.

Alternatively, if the phases $\varphi_1$ and $\varphi_2$ differ by an odd quarter number of revolutions or cycles, i. e., if $$2\varphi_1=2\varphi_2\pm(2\pi n+\pi)\left(\text{or if } \varphi_1-\varphi_2=\pi n+\frac{\pi}{2}\right.$$

where $n=0$ or a whole number) then the half power voltage waves will completely recombine in line 510 and the circuit will be totally transmitting, i. e., it will freely and completely transmit the frequency $f$ to line 510.

The following generalized equations follow readily from the above considerations:

Vs (the reflected voltage) $=e^{i(\varphi_1+\varphi_2)}\cos(\varphi_1-\varphi_2)$ Vp the transmitted voltage) $=ie^{i(\varphi_1+\varphi_2)}\sin(\varphi_1-\varphi_2)$ It is apparent, therefore, that if the transmission lines 508 and 512 of Fig. 3 be made substantially identical (normally they would be just sufficiently long to afford convenient connections between the hybrid structure H and the impedances 502 and 504), and purely reactive impedances 502 and 504 be so chosen that, over frequency bands or channels to be reflected, they produce identical phase changes and that over frequency bands, or channels to be freely transmitted they produce phase changes which differ by 90 degrees, the resulting circuit of the type shown in Fig. 5 will be a microwave frequency selective circuit of the type commonly known at lower frequencies as a wave filter.

It should be noted that equalizers are merely particular forms of those structures which pass the entire frequency band or region of interest (so-called "all-pass" structures) and introduce a predetermined delay or attenuation proportioned to equalize the delay or attenuation of the other apparatus and equipment units over said frequency region. The general class of all-pass networks includes those having uniform delay or attenuation over the range of interest. For equalizers, as for any all-pass network, the reactive impedances 502 and 504 should produce phase changes which differ by 90 degrees at all frequencies within the frequency region of interest. Since in the usual case the microwave frequency band employed as a communication channel (20 megacycles wide, for example) is "narrow," i. e. it is a small percentage of the mid-frequency of the band (a frequency in the neighborhood of 4000 megacycles, for example), microwave equalizers can be readily constructed simply by making reactive devices 502 and 504 identical and making one of the connecting lines 508 or 512 a quarter wave-length of the mid-frequency of the band longer than the other. This is illustrated and will be described in detail in connection with Figs. 9 and 10 hereinafter. This will, of course, introduce substantially the desired 90 degrees phase shift at all frequencies within the "narrow" band.

The above requirements as to phase shift correspond exactly to the requirements which determine the placing of the "poles" and "zeros" of the reactance or admittance characteristics of the series and shunt arms of a conventional low frequency, lumped element lattice structure such as that shown in Fig. 13 of the accompanying drawings where one of the reactances, for example 502 of Fig. 5, correspond to the two series reactances 1300 of Fig. 13 and the other corresponds to the shunt or cross-connected reactances 1302 of Fig. 13. The design of a conventional low frequency, lumped element lattice structure is explained in the above-mentioned "Radio Engineers Handbook" at page 239. (See also the above-mentioned papers of Bode, and Bode and Dietzold. Also of interest in this connection are H. W. Bode's Patents 1,828,454 issued October 20, 1931; 1,955,788 issued April 24, 1934; 2,035,258 issued March 24, 1936; 2,029,698 issued February 4, 1936; 2,058,210 issued October 20, 1936; and 2,342,638 issued February 29, 1944.)

It is therefore evident that the characteristics at low frequencies of the lattice network and those at very high frequencies of the combination of a wave-guide or coaxial hybrid junction with two appropriate wave-guide or coaxial reactances, respectively, connected to two of its arms, as just described above, are substantially identical and wave-guide or coaxial hybrid junction structures associated with appropriately chosen reactive devices connected by suitable lengths of transmission line to the hybrid junction, can be readily designed to reproduce at very high frequencies the numerous and varied transducer characteristics attainable at low frequencies by lattice structures designed in accordance with the now classical theories and formulae developed for low frequency, lattice type lumped element structures.

It is also, obviously, entirely practicable to approximate by appropriate wave-guide or coaxial simulating structures, the modified lattice structures of the low frequency art such as those pointed out by Bode in his book entitled "Network Analysis and Feedback Amplifier Design," published by D. Van Nostrand Company, Inc., 250 Fourth Avenue, New York, N. Y., 1945, particularly at page 270, Fig. 12.25, where one of the reactances in a lattice is replaced by a resistance (equal to the characteristic or terminating resistor 20) and still retain substantially the same variation with frequency for the device. This circuit has the disadvantage of being mismatched and having some loss, but it can be used as a phase equalizer and may in some instances provide an economy in its increased structural simplicity without introducing objectionable reactions. The microwave equivalent of the circuit of Bode's Fig. 12.25 is of particular value in adjusting the reactances 502 and 504 separately to provide the desired resonances for structures of the type illustrated in Fig. 5. The method, of course, is to replace one of the reactances by a suitable resistive structure while adjustment of the other reactance is being effected. The all-pass network, having uniform attenuation and, within wide limits of variation, any desired delay or phase-versus-frequency characteristic, is very easily obtained at very high frequencies, including microwave frequencies, by the method suggested above for obtaining equalizers, since all that is necessary is to make reactances 502 and 504 identical and to make one of the lines 508 or 512 one-quarter wavelength longer than the other, thus introducing the required substantially constant difference of 90 degrees in phase over the relatively "narrow" frequency region usually of interest in microwave systems.

Alternatively, an equivalent arrangement is to connect the reactances 504 and 502 to the parallel "P" and series "S" terminals of the "magic T" type of wave-guide hybrid structure, through lines 510 and 506, respectively, proportioned as taught in the above-mentioned application of W. D. Lewis, particularly at page 41, lines 8 to 12, inclusive, of said application, and to employ the "A" and "B" terminals for the input and output terminals (i. e., through like lines 508 and 512).

The resulting structure is analogous to an all-pass structure over the band for which the difference in the effective lengths of 510 and 506 is substantially one-quarter wavelength. As for all similar structures the equivalence to an "all-pass" structure is approximate, and applies over a limited "frequency band of interest." This limitation arises due to the inherent cut-off of wave guides, and, more seriously, due to the fact that the one-quarter wavelength difference in length of the two arms does in fact vary appreciably with a relatively substantial change in frequency for a given physical structure. The analogy does hold very well, however, for small percentage bands like the 20-megacycle band centered about a frequency in the neighborhood of 4000 megacycles as mentioned above, for example. This arrangement is illustrated in Fig. 9 where the hybrid 900 has like reactances 902 and 904 connected to its A and B terminals by transmission lines 908 and 912, which in this case should differ in length by $$\frac{\lambda}{4}$$

or 90 electrical degrees, and the "S" and "P" terminals are the input and output terminals, or vice versa, of an all-pass structure, lines 906 and 910 serving to connect to the terminals "S" and "P," respectively, of the microwave hybrid structure.

As in the case of all the hybrid arrangements described in this application, the arrangement of Fig. 9 is valid for all frequency ranges employed in communication circuits, though the structural forms of the hybrid devices and the associated elements employed will, usually, be strikingly different for widely separated frequency regions. Even at microwave frequencies a choice of several substantially different hybrid and resonant element structures are available, as discussed in detail above, and hereinafter.

It should be understood, also, that the terminals "P" and "S" are usually employed as input and output terminals, or vice versa, in structures of the invention employing the "magic T" hybrid junction, merely from considerations of convenience, it being entirely feasible to employ terminals A and B as the input and output terminals, or vice versa, and terminals P and S can then be used for other purposes in substantially the same manner as terminals A and B are described above as being used.

As in the case of lattice structures and equivalent wave filter and equalizer sections of the lower frequency art, more complex guided wave frequency range transducer characteristics can be readily obtained by the use of composite structures comprising several structures of the types illustrated in Figs. 5 and 9 connected electrically in tandem (i. e., the output of one structure is connected to the input of the next, the output of which in turn connects to the input of a third structure and so on, until all of the desired structures have been connected into the chain). For the most efficient transmission of power and to avoid difficulties which can arise from reflected energy, the output impedance of each section should, of course, match the input impedance of the section to which it is connected and the end sections should be connected to input and output circuits the impedances of which match the end sections' input and output impedances, respectively, precisely as for networks of the low frequency art. The general method involved, as applied to lower frequency structures, is explained, for example, in the article entitled "Theory and Design of Uniform and Composite Electric Wave Filters" by Otto J. Zobel, published in the Bell System Technical Journal for January 1823. The complex or over-all characteristic is, of course, arrived at by adding together the more simple characteristics of the component sections which have been assembled in the tandem arrangement.

More complex guided wave frequency range transducer characteristics can also, in some cases, be achieved conveniently by a single combination of a hybrid structure with two reactances, as illustrated in Figs. 5 and 9, in which the reactances 502, 504 or 902, 904, are of a complex nature, corresponding to a plurality of low frequency resonant, or antiresonant, circuits connected in parallel, or series, respectively. Two forms of appropriate multiresonant guided wave frequency range reactive structures for such use, are disclosed, described in detail and claimed in the above-mentioned application of W. D. Lewis, being shown diagrammatically in Figs. 13 and 14 of the Lewis application. Actual structures involving a hybrid structure with two simple singly resonant reactance structures and a hybrid with two doubly resonant reactance structures are described in the Lewis application and shown in Figs. 19 and 20 of that application. The combinations there shown are described as being designed to be all-pass structures providing the desired phase shift characteristics 1700 and 1702, respectively, of Fig. 17 of the Lewis application. By substituting multi-resonant reactances in which the "zeros" and "poles" (resonant and antiresonant frequencies, respectively) of the impedance characteristic of one are appropriately spaced with respect to those of the other (see the Bode papers and patents mentioned above, etc.) guided wave frequency range wave filters and phase or amplitude equalizers of any degree of complexity can be realized. These matters will be treated in greater detail hereinunder in connection with Figs. 6 to 16, inclusive, of the drawings accompanying the present application.

Tandem combinations of simple hybrid wave filter or equalizer structures with more complex structures can, of course, also be employed to provide an over-all characteristic of any desired degree of complexity, exactly in the manner described for low frequency, lumped element structures in the above-mentioned article by Zobel.

As mentioned above, a discrete reactance can be considered as the equivalent of a length of line, which at high and microwave frequencies can be a wave-guide or coaxial line, having a movable short circuit, the position of which short circuit along the line is subject to variation with the applied frequency in a prescribed manner. For example, if a simple parallel wire line, a substantial number of wavelengths long, is short circuited at a point a distance $l$ from the near end, at frequencies at which $l$ is $$n\frac{\lambda}{2}$$

i. e. an integral number of half wavelengths, the reactance between the near end terminals of the line is zero, i. e. that of a short circuit. At frequencies at which $l$ is $$n\frac{\lambda}{2}+\frac{\lambda}{4}$$

the reactance between the near end terminals of the line is infinite, that is, that of an open circuit.

(In the above relations $n$ is any whole number.)

This type of reactive impedance can, of course, be simulated by either a group of simple series resonant guided wave frequency range reactances connected in parallel, one of said reactances being resonant at each frequency at which the reactance is to be zero; or by a group of simple "parallel-resonant" (antiresonant) guided wave frequency range reactances connected in series, one of said antiresonant reactances becoming antiresonant at each frequency at which the reactance is to be infinite. (A similar course of reactance variation could, of course, be obtained by keeping the frequency contant and varying the distance of the short circuit along the line.)

The general theorem for the reactance of a simple smooth transmission line is, of course, $$i\frac{X}{R_0}=i\tan\frac{2\pi l}{\lambda}$$

where $R_0$ is the characteristic impedance of the line and $l$ is the length of the line.

By Foster's theorem, (see the paper entitled "A Reactance Theorem" by Ronald M. Foster, Bell System Technical Journal, volume 3, No. 2, April 1924, pages 259 to 267, inclusive) between each pair of successive frequencies at which the reactance characteristic is zero (or infinite) there must be a frequency at which the reactance characteristic is infinite (or zero, respectively).

Foster also points out the substantial equivalence, for many purposes, of a two-terminal reactance, comprising a plurality of series resonant structures connected in parallel, with a two-terminal reactance, comprising a plurality of parallel-resonant (antiresonant) structures connected in series. The question of which should be used in a particular case, can, therefore, in many cases, be determined on the basis of which can be the more conveniently realized in physical form.

The gross character, or the integrated slope, of the phase versus frequency curve of any physically realizable, purely reactive, "two-terminal network" or single terminal wave-guide reactive structure of the above-described type is determined by the location of the resonances along the frequency axis, since the difference between the values of phase at two successive resonances must be 180 degrees. Thus the general rate of increase of the curve is small if the resonances are spaced far apart in frequency and it is large if they are closely spaced.

The slope of the phase-versus-frequency curve of any physically realizable, purely reactive, two-terminal network or line, or of the equivalent guided wave frequency range structure, must also always be positive.

Furthermore, the slope at any particular frequency is adjustable to a very large degree, by adjusting the location on the frequency axis of the adjacent frequencies at which resonance occurs or by adjusting the breadth of the resonance, that is, the "broadness" or degree of damping of the resonances at the resonant frequencies between which the particular frequency is located or by combined use of both methods. A very small slope (i. e. a slow change of phase with frequency) can be produced, therefore, by means of a broad resonance or a wide spacing of the resonances or by selecting in combination a spacing of the resonances which for a predetermined degree of breadth of the resonance produces the desired slope. A very large slope (i. e., a rapid change of phase with frequency) can be produced by means of a sharp resonance and closely spaced resonant frequencies. Any intermediate slope of the phase-versus-frequency curve can be produced by means of a resonance of intermediate breadth and a frequency spacing of appropriate intermediate proximity.

As explained in the above-mentioned sole application of W. D. Lewis, in connection with Fig. 12 thereof, the approximate equivalent of a low frequency, lumped element, simple antiresonant (parallel coil and condenser) combination can comprise at microwave frequencies a section of a wave guide, closed at one end by a movable piston-like member, provided with a handle for purposes of adjustment, the other end of the section of wave guide having an iris by means of which it can be coupled to a second wave guide as illustrated for example, in Figs. 13 and 14 of the Lewis application.

In Fig. 13 of the Lewis application a waveguide structure is shown, constituting at very high frequencies the approximate equivalent of the low frequency circuit consisting of five simple lumped element, entiresonant (coil and condenser in parallel) combinations, connected in series. Any different number of cavities can be used, as long as the physical spacings prescribed are adhered to, and one antiresonance will be provided by each cavity used.

Where only one cavity is to be used, it can be connected directly on the end of the wave guide.

If desired for mechanical convenience, two or more cavities can all be placed along a common side of the guide. Alternatively, an even number of cavities (and antiresonances) can be provided by a structure in which the cavities are paired and placed on opposite sides of the guide.

Fig. 14 of the above-mentioned Lewis application is generally similar to Fig. 13 thereof, except that the five cavities are connected through irises to the wave guides along the E-plane side of the guide. This structure is the high frequency equivalent of five low frequency, series resonant, lumped-element (coil and condenser in series) combinations, connected in parallel. Any number of cavities required, to provide a particular desired "two-terminal" reactance characteristic can be used.

A few of the numerous and varied forms which structures of the present invention may take, in addition to those which were included incidentally in the above-mentioned Lewis application, are illustrated in Figs. 6, 7, 8, 10 and 12 of the drawings accompanying the present application.

In more detail in Fig. 6, of the drawings accompanying the present application, a waveguide hybrid T-type junction 600 is shown with wave-guide reactive structures of the type described in the above-mentioned Lewis application connected to the terminals 604 and 606, which terminals correspond to the "A" and "B" terminals described at length above. Terminals 602 and 608 are the "parallel" and "series" terminals "P" and "S" of the hybrid wave-guide T-type junction 600 as described at length above.

The reactance device 612 comprises a single resonant cavity coupled, by an iris, directly to terminal 604 of the hybrid T junction 600 and is the microwave (or very high frequency) equivalent of a single antiresonant circuit such as the low frequency lumped-element structure consisting of an inductance and a capacity connected in parallel. The iris, connecting cavity 612 to junction 600, is vertical and centered in terminal 604 so as to extend across the larger cross-sectional dimension of the cavity as for the cavities in Fig. 13 of the above-mentioned Lewis application.

The reactance device 610 comprises two cavities 614 and 618 each of which is coupled by an iris (vertical) to the section of wave guide completing the structure 610, which wave-guide section is closed at its left end and connected at its right end to terminal 606 of the hybrid junction 600. Device 610 is also of the type shown in Fig. 13 of the Lewis application and is therefore the microwave (or very high frequency) equivalent of two antiresonant low frequency lumped-element structures each of which comprises an inductance and a capacity connected in parallel, the two antiresonant combinations being connected in series.

The complete structure of Fig. 6 is, therefore, the microwave (or very high frequency) equivalent of a low frequency lumped-element structure of the lattice type illustrated in Fig. 13 of the drawings of this application wherein each of the series elements 1300 comprises, for example, an inductance in parallel with a capacity and each of the cross-connected elements 1302 then comprises two combinations connected in series, each combination comprising an inductance and a capacity connected in parallel.

The impedance characteristics for one typical form the complete structure of Fig. 6 can take, can, therefore, be those shown in Fig. 16 of the drawings accompanying the present application.

In Fig. 16 curve 1602 repesents the impedance curve of the antiresonance produced by the single cavity 612. Curve 1600 represents the impedance of the pair of cavities 614 and 618 of the structure 610.

The elementary theory of low frequency lumped-element wave filters can now be applied directly in interpreting the transmission characteristics of the over-all structure of Fig. 6. From this fundamental theory it is at once apparent by inspection of Fig. 16, that the structure of Fig. 6 is a band-pass wave filter passing the band of frequencies between the antiresonant frequencies *a* and *b* of curve 1600 and attenuating all frequencies below frequency *a* and above frequency *b*. The coincidence in frequency of the antiresonant frequency *c* of curve 1602 with the resonant frequency *d* of curve 1600 fulfills a fundamental requirement of elementary wave filter theory that throughout the transmitting band of a lattice type wave filter structure the resonances of the series arms should be coincident in frequency with the antiresonances of the cross-connected (shunt) arms and/or vice versa. In accordance with elementary wave filter theory when a critical frequency (resonance or antiresonance) in the series (or shunt) arm has no frequency coincident critical frequency (resonance or antiresonance) in the shunt (or series) arm a change from transmission to attenuation takes place and the frequency is known as a "cut-off" frequency.

These and other fundamental principles are illustrated further in the more complicated impedance diagrams of Figs. 14 and 15 of the drawings of the present application.

In Fig. 14 each of the antiresonant frequencies *a*, *b* and *c* of curve 1400 is coincident in frequency with a resonant frequency *k*, *l* and *m*, respectively, of curve 1402. Also each of the antiresonant frequencies *h*, *i* and *j* of curve 1402 is coincident in frequency with a resonant frequency *d*, *e*, and *f*, respectively, of curve 1400. From the elementary principles given above, it is obvious by inspection that, for example, a lattice structure whose series arms have an impedance characteristic as illustrated by curve 1400 and whose shunt (or cross-connected) arms have an impedance characteristic as illustrated by curve 1402 will be an all-pass structure, i. e., it will transmit all frequencies within the frequency region covered by Fig. 14. To realize such an all-pass structure for use in the guided wave frequency range, it is apparent that the type of structure illustrated in Fig. 6 can be employed provided resonant devices 610 and 612 are replaced by devices of the same character except that each will have three resonant cavities, one of the devices providing antiresonances at frequencies *a*, *b* and *c* of curve 1400 of Fig. 14 and the other device providing antiresonances at frequencies *h*, *i* and *j* of curve 1402. The devices can, of course, be constructed as taught in the above-mentioned Lewis application in connection with Fig. 13 of his drawings.

In Fig. 15, impedance characteristics of a still more complicated structure are shown, curve 1500 representing the impedance characteristic of an impedance device providing antiresonances *a*, *b*, *c* and *d* and curve 1502 representing those of an impedance device providing antiresonances *i*, *j*, *k* and *l*.

From elementary wave filter theory, for a structure of the general type illustrated in Fig. 6, in which impedance devices 610 and 612 have been replaced by more complex devices having the impedance characteristics represented by curves 1500 and 1502, respectively, the transmission characteristics of the over-all structure can be immediately stated from inspection of Fig. 15.

The frequencies *d* of curve 1500 and *j* of curve 1502 are "cut-off" frequencies as there is no critical (resonant or antiresonant) frequency coincident in frequency with these in the other curve (1502 or 1500, respectively). These frequencies therefore mark transitions from transmitting to attenuating regions or vice versa. Between frequencies *d* and *j* each antiresonance *b* and *c* of curve 1500 is coincident in frequency with a resonance *n* and *o*, respectively, of curve 1502 and each antiresonance *k* and *l* of curve 1502 is coincident in frequency with a resonance *f* and *g*, respectively, of curve 1500. The structure, therefore, will transmit all frequencies between frequencies *d* and *j*.

Below (or to the left of) frequency *j* antiresonance *a* of curve 1500 is coincident in frequency with antiresonance *i* of curve 1502 and resonance *e* of curve 1500 is coincident in frequency with resonance *m* of curve 1502 so that, from elementary wave filter theory, peaks of attenuation (approximating infinite attenuation) will occur at these frequencies. Above (or to the right of) frequency *d*, resonance *h* of curve 1500 is coincident in frequency with resonance *p* of curve 1502 so that a peak of attenuation will also occur at this frequency. The corresponding structure of the type shown in Fig. 6 with appropriately chosen more complex reactive or impedance devices, of the type for example described in the above-mentioned Lewis application, replacing 610 and 612, will, accordingly, be the microwave or very high frequency equivalent of a wave filter transmitting all frequencies between frequencies *d* and *j*, attenuating all other frequencies and having peaks of attenuation at frequencies *a*, *e* and *h*.

From the above examples it is apparent that any desired wave filter or equalizer structure of the low frequency lumped-element lattice type can be simulated in the guided wave frequency range, by the combination of a hybrid structure and two reactive structures, of appropriate complexity, as illustrated by the relatively simple arrangement of Fig. 6 of the drawings of the present application.

Other arrangements essentially equivalent in their general characteristics to that of Fig. 6 are shown in Figs. 7 and 8 of the drawings accompanying the present application.

In Fig. 7 the four-terminal wave-guide hybrid ring junction 700 corresponds in general to the wave-guide hybrid T junction 600 of Fig. 6 with distinctions of a secondary nature as were discussed in detail above. The resonant cavity type reactive devices 710 and 712 can be substantially identical with devices 610 and 612, respectively, of Fig. 6. As taught by Tyrrell in his above-mentioned paper, terminals 702 and 708 comprise one conjugate pair and are employed as input and output terminals respectively, or vice versa. Terminals 704 and 706 comprise a second conjugate pair and are employed to connect to the reactive devices 712 and 710, respectively, as shown in Fig. 7. The impedance characteristics of the reactive devices 710 and 712 can be those illustrated by curves 1600 and 1602 of Fig. 16, respectively, in which case the arrangement shown in Fig. 7 will have the same transmission characteristics as described for the arrangement of Fig. 6 when reactive devices 610 and 612 were assumed to have the impedance characteristics 1600 and 1602 of Fig. 16.

Similarly, Fig. 8 shows a coaxial hybrid ring junction comprising outer conductor 800 and inner conductor 801 in which terminals 802, 803 and 808, 809 comprise one conjugate pair and are used as input and output terminals, respectively, or vice versa.

Terminals 804, 805 and 806, 807 comprise the second conjugate pair and serve to connect to coaxial impedance devices 810 and 812 which, in accordance with principles explained in Reissue Patent 20,859, granted September 13, 1938 to R. K. Potter, can provide at high frequencies the equivalent of two simple lumped-element antiresonant structures in series and a single simple lumped-element antiresonant structure (inductance and capacity connected in parallel), respectively. Thus the reactive devices 810 and 812 can also be proportioned to provide the impedance characteristics represented by the curves 1600 and 1602 of Fig. 16 and the over-all structure of Fig. 8 will then have the general transmission characteristics described above in connection with Fig. 6, under similar circumstances.

In general, the coaxial form of wave filter or equalizer, as exemplified by the arrangement shown in Fig. 8, will be found more convenient for use in the high frequency range and in the lower portions of the very high frequency range. Wave-guide arrangements, as illustrated by Figs. 6 and 7, will be found more convenient for use in the higher frequency portions of said ranges and at microwave frequencies, the two fields of usefulness overlapping to a considerable degree as for coaxial and wave guide arrangements in general, as is well understood by those skilled in the art.

In Fig. 10 a specific structural embodiment of the arrangement illustrated in block schematic diagram form by Fig. 9 (described above) is shown.

The wave-guide hybrid T junction 1000 can be substantially identical to junction 600 of Fig. 6 described above. The reactive devices 1010 and 1012 can be identical and can also be identical to device 610 of Fig. 6 described in detail above. The section of wave guide 1014 is a quarter wavelength of the median frequency of the range of interest and is interposed between terminal 1004 of junction 1000 and device 1012 as shown. Device 1010 is connected directly to terminal 1006 of junction 1000. Terminals 1002 and 1008 comprise one conjugate pair and serve as input and output terminals, respectively, or vice versa. Terminals 1004 and 1006 comprise, of course, the second conjugate pair. Since devices 1010 and 1012 are identical their antiresonances will be coincident in frequency. However, the quarter wavelength of wave guide 1014 acts, as is well-known in the art, as an impedance inverter so that at terminal 1004 of junction 1000 the antiresonances of device 1012 will appear to be resonances. The impedance characteristics of the devices 1010 and 1012 as they appear at terminals 1006 and 1004, respectively, will therefore be similar to those shown by curves 1400 and 1402 of Fig. 14 in that each of the two antiresonances appearing at terminal 1006 will be coincident in frequency with a resonance appearing at terminal 1004 and the over-all structure of Fig. 10 is therefore an "all-pass" type of "wave filter" throughout the frequency region in which the resonances and antiresonances are located. Such a structure can be employed, as described at length above, as a delay equalizer. Also if appropriate resistance components are introduced in devices 1010 and 1012, as is also described above, the over-all structure of Fig. 10 can be employed as an attenuation equalizer.

Figs. 11 and 12 represent in block diagrammatic form and in one structural form, respectively, a type of all-pass structure in which like reactive devices are connected to the "P" and "S" terminals of a "magic T" type wave-guide hybrid junction, in which the hybrid junction is proportioned as taught by W. D. Lewis in his above-mentioned application particularly at page 41, lines 8 to 12, inclusive, of said application.

In Fig. 11, junction 1100 is a "magic T" type hybrid junction, lines 1108 and 1112 representing the P and S arms of the junction and lines 1106 and 1110 representing the A and B arms of the junction, respectively. Like wave-guide reactive devices 1102 and 1104 are connected to lines 1108 and 1112 respectively as shown.

In Fig. 12 a specific structural embodiment of the general type of all-pass network represented by the block diagram of Fig. 11, is shown. The magic T wave-guide hybrid junction is designated 1200. Terminals 1206 and 1208 are the "S" and "P" terminals of the junction, respectively, to which doubly antiresonant, identical wave-guide reactances 1212 and 1210 are connected, respectively, as shown. Terminals 1202 and 1204 are the "A" and "B" terminals of the junction, respectively, either one of which can be employed as the "input" terminal, the other then being employed as the output terminal. The structure of Fig. 12 is equivalent to that of Fig. 10 when the wave-guide junction is appropriately proportioned as taught by Lewis in his above-mentioned application.

In Fig. 17 of the drawings accompanying this application, an additional structure of the invention is shown in block schematic diagram form. This structure includes a wave-guide or coaxial hybrid structure H designated 1700. A terminal of one conjugate pair is connected to a terminal of the other conjugate pair of hybrid structure 1700 by the circuit including lines 1704 and 1710 (wave guide or coaxial) and reactive device 1702.

Device 1700 of Fig. 17 can be a "magic T" type wave-guide hybrid junction similar to junction 600 of Fig. 6, in which case its terminals can correspond to terminals 602, 608, 604 and 606, respectively, of the junction 600.

Alternatively, it can be a wave-guide ring hybrid junction similar to junction 700 of Fig 7, in which case its vertical terminals can correspond to either terminals 702 and 708, respectively, or to terminals 704 and 706, respectively; the horizontal terminals of the Fig. 17 junction 1700 then corresponding to those of the other pair of terminals of the junction 700 of Fig. 7.

As a further alternative, junction 1700 can be of the coaxial ring type as illustrated by junction 800, 801 of Fig. 8 and the terminals of junction 1700 can then correspond to terminals 802, 803; 808, 809; 804, 805 and 806, 807, respectively, of Fig. 8.

In each and every case, the loop circuit, including lines 1704 and 1710, is connected between one terminal of one conjugate pair and one terminal of the other conjugate pair of hybrid junction terminals, the free terminal of one conjugate pair being then the input terminal for the over-all circuit and the free terminal of the other conjugate pair then being the output terminal for the over-all circuit.

When the hybrid junction is a wave-guide structure of either the "magic T" or wave-guide ring type, the "loop circuit" can comprise simply a length of wave guide with portions thereof curved appropriately as illustrated in Fig. 21, for example, described hereinafter.

When the hybrid junction is a coaxial ring structure, such as ring 800, 801 of Fig. 8, a loop of coaxial line can be employed to connect the appropriate two terminals together.

For more convenient adjustment, for purposes, a number of which will be described in detail below, the loop of transmission line joining the terminals as shown in Fig. 17, or the equivalent terminals of other junctions as above-described, can include an adjustable phase shifting device 1702, in which case two portions of transmission line 1704 and 1710 are used to complete the "loop."

Figs. 18 and 20 illustrate, in block diagrammatic form, two methods of connecting two structures of the type illustrated in Fig. 17 in tandem or cascade relation.

In Fig. 18 two devices of the type illustrated by Fig. 17 are connected directly in tandem or cascade relation. The first of these comprises hybrid junction 1800, corresponding to junction 1700 of Fig. 17, and a loop comprising an adjustable phase shifter 1802 connected to one terminal of the junction by transmission line 1810 and to a second terminal of the junction by transmission line 1812, as shown. The second device in Fig. 18 of the type illustrated in Fig. 17, comprises hybrid junction 1804 and a loop comprising an adjustable phase shifter 1806 connected to one terminal of the junction by transmission line 1816 and to a second terminal of the juncture by transmission line 1818. Finally the output terminal of the first device is connected to the input terminal of the second device by transmission line 1814. The input terminal 1808 of the first device and the output terminal 1820 of the second device, then become the input and output terminals, respectively, of the over-all combination of Fig. 18. The utility of combinations of the type shown in Fig. 18 will be indicated hereinafter.

The circuit arrangement of Fig. 20 is equivalent in its over-all possible electrical characteristics to that of Fig. 18. It differs from the arrangement of Fig. 18, obviously, in that the second structure, comprising hybrid junction 2002, two terminals of which are connected by loop circuit comprising adjustable phase shifter 2006 and transmission lines 2012 and 2014, is connected directly in the "loop circuit" of the first structure so that the input circut 2008 and output circuit 2020 of the first stucture are also the input and output circuits, respectively, of the overall structure. The first structure comprises hybrid junction 2000, two terminals of which are connected by a loop circuit which comprises adjustable phase shifter 2004, transmission line 2018 connecting the phase shifter 2004 to one terminal of junction 2000, transmission line 2016 connecting phase shifter 2004 to one terminal of junction 2002, the junction 2002 with its associated loop as described in detail above, and transmission line 2010 connecting a second terminal of junction 2002 to a second terminal of junction 2000, as illustrated in Fig. 20.

The circuit arrangement of Fig. 19 is similar to that of Fig. 17 except that the loop circuit of Fig. 19 includes an attenuator 1902 as well as an adjustable phase shifter 1904 and an indicator 1906 connected to the output terminal of hybrid junction 1900. The "loop circuit" of the arrangement of Fig. 19 comprises as shown, in addition to attenuator 1902 and phase shifter 1904, a transmission line 1910 connecting a first terminal of junction 1900 to attenuator 1902, a transmission line 1912 connecting attenuator 1902 to phase shifter 1904 and a transmission line 1914 connecting phase shifter 1904 to a second terminal of junction 1900. Various uses to which the arrangement of Fig. 19 can be put will be described in detail below.

In its simplest form the "loop circuit" connecting the terminations of Fig. 17 as described above, can comprise a loop of wave guide (or of coaxial line, depending upon the junction being employed) and the over-all combination of Fig. 17 then becomes a phase equalizer the properties of which are mathematically derived in the following manner:

$$E_3=\frac{E_1}{\sqrt{2}}-\frac{E_2}{\sqrt{2}} \qquad (1)$$

$$E_4=\frac{E_1}{\sqrt{2}}\frac{E_2}{\sqrt{2}} \qquad (2)$$

where $E_1$ is the input voltage across the upper terminal (line 1706); $E_2$ is the voltage across the lower terminal (right end of line 1710); $E_3$ is the voltage across the left terminal (right end of line 1704); and $E_4$ is the output voltage across the right terminal (left end of line 1708).

Let $$E_2=nE_3 \qquad (3)$$

where $n=N\theta$ $N$=ratio of the magnitude of $E_3$ to $E_2$ $\theta$=electrical length of the "loop circuit" between the left and lower terminals, in radians=

$$\frac{2\pi lf}{v}$$

where $l$=length of line
$v$=velocity
$f$=frequency then $$\frac{E_4}{E_1}=\frac{n\sqrt{2}+l}{\sqrt{2}+n}$$

$$=\frac{\sqrt{2}(1+N^2)+3N\cos\theta+j\sin\theta}{2+N^2+2N\sqrt{2}\cos\theta} \qquad (4)$$

If N is unity, i. e., if the loss is substantially zero, the magnitude of $$\frac{E_4}{E_1}$$

is also unity for all values of $\theta$, and $$\frac{E_4}{E_1}=1\underline{|\alpha}=\frac{2\sqrt{2}+2\cos\theta=j\sin\theta}{3+2\sqrt{2}\cos\theta} \qquad (5)$$

$$\tan^{-1}\alpha=\frac{\sin\theta}{2\sqrt{2}+3\cos\theta} \qquad (6)$$

In a phase equalizer we are interested in the variation in the phase shift of the device, $\alpha$, as a function of frequency. Over the band of interest $\theta$ is proportional to frequency and $\alpha$ as a function of frequency can be determined from (6).

In many problems phase equalizers are specified in terms of their delay characteristics. The delay is defined as the rate of change of phase with respect to $2\pi f$.

$$T=\frac{d\alpha}{d\omega}$$

Taking $$\theta=\frac{2\pi lf}{c}$$

T can be calculated by differentiating Equation 6

$$T=\frac{l}{c}\left[3-2\sqrt{2}\left(\frac{2\sqrt{2}+3\cos\theta}{3+2\sqrt{2}\cos\theta}\right)\right] \qquad (7)$$

When $\cos\theta=1$, $\quad T=0.172\frac{l}{c}$

When $\cos\theta=-1$, $\quad T=5.83\frac{l}{c}$

The curve 402 of Fig. 4, by way of example, is a plot of the more central portion of the curve resulting from a plot of Equation 7 for a particular delay equalizer and shows the delay T as a function of frequency over a frequency range in which $\cos\theta$ varies from about 0 through $-1$ and back to 0. The maximum delay occurs at $f_0$ which is the frequency for which $\cos\theta=-1$. Equation 7 applies to the case where the path including line 1704, device 1702 and line 1710 of Fig. 17, is replaced by an air dielectric transmission line with a group velocity equal to that of light. If the path is a wave guide and associated apparatus as illustrated schematically in Fig. 17, having a different group velocity (or if it is a loaded coaxial line and associated apparatus) then $l$ in Equation 7 must be the equivalent electrical length of the path or loop circuit, rather than the physical length of the connecting line, and Equation 7 will then become an approximate formula, but is still close enough for practical use.

If we define $$Q=\frac{f_0}{2\Delta f}$$

where $2\Delta f$ is the bandwidth between the frequencies at which T has one-half its maximum value, then $$Q=\frac{5.83l\pi f_0}{2C}=\frac{9.15lf_0}{C}$$

$$2\Delta f=\frac{C}{9.15l} \qquad (8)$$

It is apparent from Equation 7 that at high frequencies small changes in $l$ serve to adjust the peak of the delay characteristic to a particular $f_0$, while it can be seen from Equation 8 that regardless of $f_0$ the bandwidth of the device is a function of the gross length of the line.

The results obtained with a structure of the general type exemplified by Fig. 17 are, of course, substantially identical with those which can be obtained by properly designed structures of the general types represented by Fig. 5, 9 or 11. A structure of Fig. 17, obviously, however, has the advantage of greater simplicity and fewer structural elements.

The curve 402 of Fig. 4 is similar to the amplitude curve of a tuned circuit. This suggests the possibility of using two or more of the equalizers of the types illustrated in Figs. 10, 12 and 17, for example, to produce arbitrarily shaped delay curves in much the same way that staggered tuned circuits are used to produce arbitrary amplitude response curves. This can be done without difficulty since the equalizers of Figs. 10, 12 and 17 are constant resistance devices which do not depend upon reflections and are therefore matched at all frequencies and can be connected in tandem without interaction.

Fig. 18, as described above, shows two equalizers of the type of Fig. 17 connected in tandem. Phase shifters 1802 and 1806 have been included in the respective loop circuits of these equalizers as shown. These phase shifters can each consist of a tapered dielectric or metal vane arranged to move in from the side of a wave guide in the manner shown in Fig. 1 of applicant's copending application Serial No. 640,495, filed January 11, 1946. This application has been abandoned. Alternatively, the phase shifters 1802 and 1806 can be of either of the forms shown in Figs. 2 and 3 of my copending application Serial No. 640,495.

The phase shifters can obviously be used to adjust $\theta$ or $f_0$ without the need for changing the physical length of the line. This greatly eases the problem of adjustment of the equalizer to operate at a given frequency. The gross length of the lines can then be determined on the basis of the desired bandwidth alone and $f_0$ controlled by the phase shifter (or shifters).

An analysis of the operation of the phase or delay equalizer illustrated schematically in Fig. 17 discloses some important properties of this basic circuit. It is apparent from the properties of a hybrid, as expressed by Equations 1 and 2, that transmission from the input 1706 to the output 1708 takes place by way of two paths.

One path, directly through the hybrid, furnishes the portion $$\frac{E_1}{\sqrt{2}}$$

of the output voltage while the other path via 1704, 1702 and 1710 furnishes the portion $$\frac{E_2}{\sqrt{2}}$$

The relative phase of the two portions determines the over-all result. We have shown that $$\frac{E_4}{E_1}$$

has an amplitude of unity for all phases of the loop path when the loop is lossless, i. e. does not involve substantial energy dissipation, but that the rate of change of phase of $$\frac{E_4}{E_1}$$

has maxima and minima as $\theta$ is varied either by changing $f$ or $l$.

The circuit has an apparent multiplying characteristic in that the apparent maximum length of the total transmission path from the input terminal to the output terminal of the hybrid junction 1700 is 5.82 times the electrical length of the "loop" connecting the left and the lower terminals. The multiplying effect occurs in other ways as well. For instance, if device 1702 is made an attenuator with a 3-decibel loss and cos $\theta=-1$, the loss from the input terminal to the output terminal will be infinite, and all the power introduced will be absorbed by the attenuator.

When cos $\theta=+1$, the loss between the input and output terminals of Fig. 17 with the attenuator adjusted for a 3-decibel loss will be 0.4 decibel. This suggests the use of the modified device as a wave meter.

Fig. 19 illustrates, in schematic diagram form, the modification of the arrangement of Fig. 17 for use as a wave meter. 1902 is a 3-decibel attenuator (assuming the other components to be free from attenuation) 1904 is an adjustable phase shifter, and 1906 is an indicator. (Appropriate coaxial and wave-guide attenuators of numerous types are well-known to those skilled in the art. See for example Patent 1,957,538 granted May 8, 1934 to A. G. Jensen; 2,151,157 granted March 17, 1939 to S. A. Schelkunoff and 2,197,123 granted April 16, 1940 to A. P. King, as well as the above-mentioned reissue patent to R. K. Potter.)

The total value of $\theta$ depends, of course, upon the phase shift in lines 1910, 1912 and 1914 and attenuator 1902 plus the phase shift introduced by phase shifter 1904. The total attenuation, of course, also includes the attenuation of the other elements of the loop circuit as well as that of the attenuator itself. If, therefore, the connecting lines 1910, 1912 and 1914 are fixed in length and the attenuation of the entire loop including devices 1902 and 1904 is just 3 decibels, then the frequency of infinite attenuation can be controlled by the phase shifter 1904 which can then be calibrated in terms of frequency. The indicator 1906 serves to show when the output is substantially zero.

The phase shift $\theta$ is obviously a function of frequency and will vary faster with frequency in proportion as the total length of the lines 1910, 1912 and 1914 is increased, so that for long lines the device is very sensitive with respect to frequency changes while for short lines it is less sensitive. On the other hand the response is multivalued if the lines are made relatively long, in that if the frequency is changed sufficiently from a given value so that the total line length changes by one wavelength, a duplicate response is obtained. In wave-meter service it is therefore necessary either to confine the frequency band of interest to the region of one predetermined definitely known minimum response, or to use "coarse" and "fine" wave meters, the "coarse" wave meter having relatively short interconnecting lines and being employed to identify the exact response being observed, and the "fine" wave meter having relatively long interconnecting lines and providing the desired degree of accuracy.

The circuit discussed as a wave meter can also obviously be employed as a wave trap with a very high attenuation at one frequency, and relatively small attenuation over a wide band of frequencies. Also, obviously, several units can be used in tandem to provide a wider band of high attenuation by "staggering the peaks," i. e. by spacing the frequencies of high attenuation of the several units at appropriate intervals throughout the band of frequencies to be attenuated, this use being similar to the use of several delay equalizers with "staggered maxima" to obtain more complex delay characteristics.

The Formula 4 from which the performance of the hybrid structure with a loop circuit of the general type illustrated in Figs. 17 to 20, inclusive, has been determined, applies when the path around the loop is matched, i. e. when there are no reflections arising from impedance mismatching in the loop path.

Fig. 21 illustrates one simple structural form for which Fig. 17 can serve as a schematic diagram except that no provision is made for adjusting the phase of the loop circuit which in Fig. 21, of course, comprises simply the loop of wave guide 2100. The hybrid junction 600 is the familiar wave-guide "magic T" of Fig. 6. Adjustment of phase in the case of Fig. 21 can, however, be effected by substituting wave-guide loops of lengths differing from that of loop 2100 until a loop having the desired phase shift is obtained.

Figure 22:
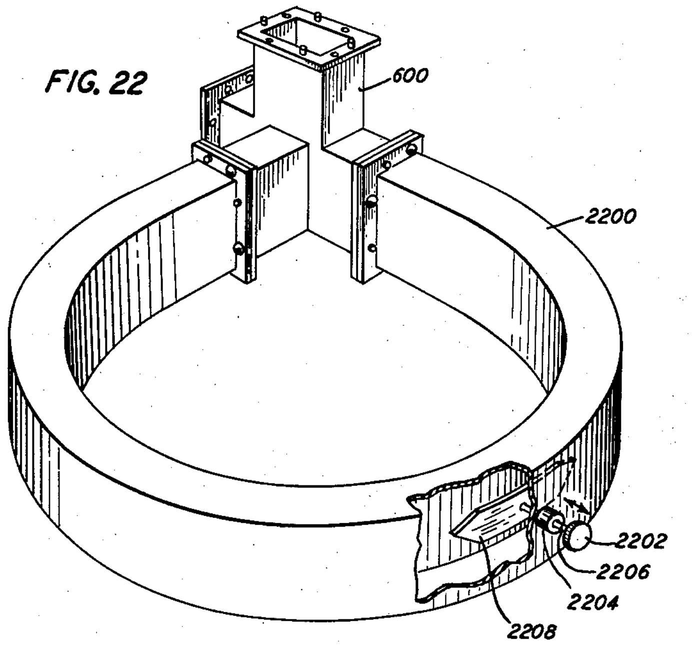

Fig. 22 illustrates the further step over Fig. 21 of including a variable phase shift adjustment in the wave-guide loop 2200. Adjustment is effected by increasing or decreasing the separation between member 2208 and the side of loop 2200 by means of knob 2202 and rod 2206. A bushing 2204 is preferably provided and fastened to the loop 2200 to serve as a guide for rod 2206 to slide in. The principles and construction of such an adjustable phase shifter are explained in my copending application Serial No. 640,495 mentioned above. Hybrid structure 600 can again be the wave-guide "magic T" of Fig. 6.

Figure 23:
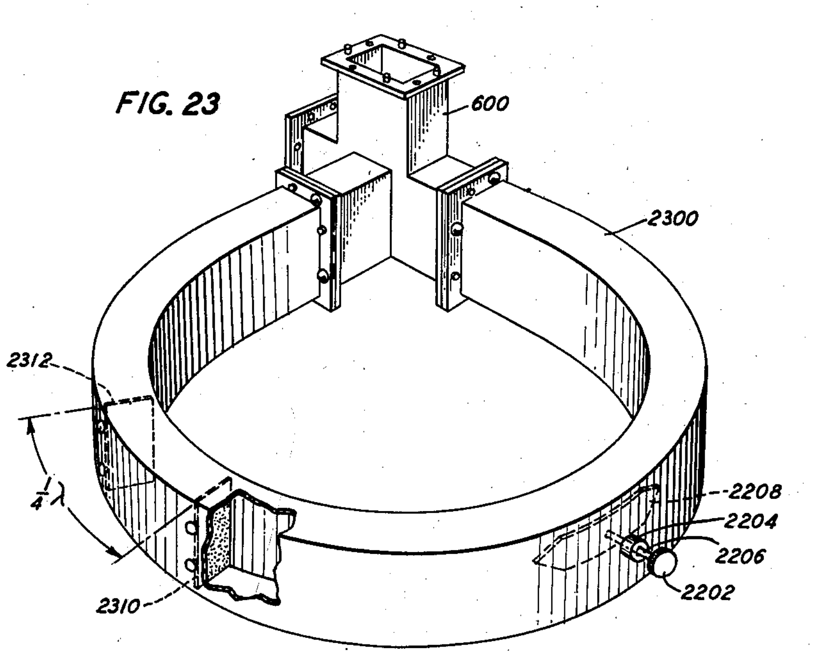

Fig. 23 illustrates an additional feature comprising the incorporation of attenuation in the wave-guide loop 2300. Adjustment of phase is effected as for the arrangement of Fig. 22, described above, like parts of the phase adjusting structure being given like numbers in the two figures. Attenuation is effected by the simple arrangement disclosed in Figs. 5 and 5A of the Schelkunoff Patent 2,151,157 mentioned above which comprises inserting in the wave-guide loop 2300 two partitions of resistive material 2310 and 2312, spaced one-quarter wavelength apart as taught by Schelkunoff. In accordance with applicant's discussion of Fig. 19 of the present application given above, the total attenuation of the loop structure 2300, including members 2310 and 2312, should be 3 decibels. When so proportioned the structure of Fig. 23 can be employed as a wave meter as described for schematic diagram Fig. 19, the energy whose frequency is to be measured being applied to either of the free terminals of the hybrid junction 600 of Fig. 23 and a meter being connected to the other free terminal to indicate when the output has dropped substantially to zero. A suitable type of meter is for example, the well-known combination of a crystal detector and meter connected to read the crystal current.

The above-described arrangements are simply illustrative of a few of the many applications of the principles of the invention. Numerous and various other embodiments of the principles of the invention will readily occur to those skilled in the art within the spirit and scope of the invention.

What is claimed is:

1. A frequency sensitive transducer for use in a very high frequency wide band transmission system, said transducer comprising a very high frequency electromagnetic wave wave-guide hybrid ring junction having four terminals, a first one of said terminals being conjugately related to a second one of said terminals, and a third one of said terminals being conjugately related to a fourth one of said terminals, and two high frequency electromagnetic wave wave-guide resonators having different electrical impedance characteristics, one of said resonators having at least two principal resonant frequencies, successive ones of said resonant frequencies being separated from each other in frequency by an interval less than that of the wide band of frequencies of said transmission system, said one of said resonators connecting electrically to said first one of said terminals, the other of said resonators connecting electrically to said second one of said terminals, the principal resonant frequencies of said resonators being disposed with respect to said wide band of frequencies to impart a predetermined transmission characteristic between said third and fourth terminals to said transducer over said wide frequency band.

2. A frequency sensitive transducer for use in a very high frequency wide band transmission system, said transducer comprising a very high frequency electromagnetic wave four-terminal wave-guide ring hybrid junction, two high frequency electromagnetic wave wave-guide resonators one of said resonators having a larger number of principal resonant frequencies than the other said principal resonant frequencies being separated in frequency by an interval less than that of the wide band of frequencies of said transmission system, one of said resonators being electrically connected to one terminal of said junction, the other of said resonators being connected to a second terminal of said junction which second terminal is conjugately related to said one terminal, the third and fourth terminals of said junction being also conjugately related, the principal resonant frequencies of said resonators being disposed with respect to said wide band of frequencies to impart a predetermined transmission characteristic between said third and fourth terminals to said transducer over said wide frequency band.

3. A frequency sensitive transducer for use in a very high frequency wide band transmission system, said transducer comprising a very high frequency electromagnetic wave four-terminal coaxial line ring hybrid junction, two high frequency electromagnetic wave coaxial line resonators, one of said resonators having at least two principal resonant frequencies separated by a frequency interval less than said wide band, and being electrically connected to one terminal of said junction the other of said resonators being electrically connected to a second terminal of said junction which second terminal is conjugately related to said one terminal, the third and fourth terminals of said junction being also conjugately related, the principal resonant frequencies of said resonators being disposed with respect to said wide band of frequencies to impart a predetermined transmission characteristic between said third and fourth terminals to said transducer over said wide frequency band.

4. A frequency sensitive transducer for use in a very high frequency wide band transmission system, said transducer comprising a very high frequency electromagnetic wave four-terminal guided wave frequency range hybrid junction, two high frequency electromagnetic wave guided wave frequency range resonators, one of said resonators having at least two principal resonant ferquencies, successive ones of said resonant frequencies being separated by a frequency interval less than said wide band, said resonator being electrically connected to one terminal of said junction, the other of said resonators being electrically connected to a second terminal of said junction which second terminal is conjugately related to said one terminal, the third and fourth terminals of said junction being also conjugately related, the principal resonant frequencies of said resonators being disposed with respect to said wide band of frequencies to impart a predetermined transmission characteristic between said third and fourth terminals to said transducer over said wide frequency band.

5. The arrangement of claim 4 in which each of said resonators has a plurality of principal resonant frequencies, the intervals between successive ones of said frequencies being less than said wide band, some of the resonant frequencies of one of said resonators being coincident in frequency with like resonant frequencies of said other resonator whereby the transmission characteristic of said transducer will provide high attenuation at and in the vicinity of said coincident frequencies.

6. The arrangement of claim 4 in which each of said resonators has a plurality of principal resonant and antiresonant frequencies, one or more of which is not coincident in frequency with a principal resonant or antiresonant frequency of the other resonator whereby the transmission characteristic of said transducer will undergo a transition from a condition of free transmission to appreciate attenuation, or vice-versa, as the frequency being transmitted is varied through a frequency range including one of said non-coincident principal resonant or antiresonant frequencies.

7. A transducer for high frequency electromagnetic wave energy which comprises a four-terminal guided wave frequency range hybrid junction, and two high frequency electromagnetic wave guided wave frequency range impedance means one of said means having at least two principal resonant frequencies, successive ones of said resonant frequencies being at intervals less than the band of frequencies transmitted by said transducer, said two impedance means being electrically connected to two terminals of said junction respectively, said impedance means being substantially pure reactances and being the sole electrical terminations of their respective terminals, said impedances being mutually proportioned and arranged so that when energy having frequencies within a predetermined band of frequencies is introduced into a third terminal of said junction the energy output from the fourth terminal of said junction will have predetermined phase and/or amplitude versus frequency characteristics imposed thereupon.

8. A frequency sensitive, transducer for high frequency, electromagnetic wave, energy comprising a high frequency, electromagnetic wave, hybrid junction having four terminals, and two high frequency, electromagnetic wave, reactive devices, one of said devices having at least two principal resonant frequencies, the intervals between successive ones of said resonant frequencies being less than the band of frequencies transmitted by said transducer, two terminals of said junction being terminated solely by said two reactive devices, respectively whereby the transmission characteristic between the other two terminals of said hybrid junction will have a predetermined mode of variation over a band of frequencies including the principal resonant frequencies of said impedance means.

9. A frequency sensitive, transducer for high frequency electromagnetic wave energy comprising a high frequency electromagnetic wave hybrid junction having four terminals, two high frequency electromagnetic wave impedance means connected to two terminals of said junction respectively, a first one of said impedance means having more than one principal resonant frequency successive ones of said resonant frequencies being at intervals less than the frequency band with which said transducer is to be used, and the second of said impedance means having at least one principal resonant frequency, at least one critical frequency of said first means being coincident in frequency with a critical frequency of said second impedance means whereby the over-all transducer will have a transmission versus frequency characteristic between the other two terminals of the hybrid junction which will vary in a prescribed manner throughout a band of frequencies including the principal resonant frequencies of said impedance means.

10. The transducer of claim 8 in which said junction and said reactive devices are high frequency, electromagnetic wave, wave-guide structures.

11. The transducer of claim 10 in which said junction is a high frequency, electromagnetic wave, wave-guide "magic Tee."

12. The transducer of claim 10 in which said junction is a high frequency, electromagnetic wave, wave-guide ring.

13. The transducer of claim 8 in which said junction and said reactive devices are high frequency, electromagnetic wave, coaxial line structures.

14. The transducer of claim 8 in which one arm, connected to one of said reactive devices, is a quarter wavelength of the median frequency, of the frequency band of electromagnetic waves to be transmitted through the transducer, longer than the arm connected to the other of said reactive devices.

15. The transducer of claim 9 in which said junction and said two impedance means are high frequency, electromagnetic wave, wave-guide structures.

16. The transducer of claim 15 in which said junction is a high frequency, electromagnetic wave, wave-guide ring.

17. The transducer of claim 15 in which said junction is a high frequency, electromagnetic wave, wave-guide "magic Tee."

18. The transducer of claim 17 in which said two impedance means are connected to the pair of arms, respectively, of said "magic Tee" which arms have a common longitudinal axis.

19. The transducer of claim 17 in which said two impedance means are connected to the pair of arms, respectively, of said "magic Tee" which arms have mutually perpendicular longitudinal axes.

20. The transducer of claim 9 in which said junction and said impedance means are high frequency, electromagnetic wave, coaxial line structures.

DOUGLAS H. RING.

REFERENCES CITED

The following references are of record in the file of this patent:

UNITED STATES PATENTS

| Number | Name | Date |
|---|---|---|
| 2,134,278 | Alford | Oct. 25, 1938 |
| 2,212,240 | Lalande et al. | Aug. 20, 1940 |
| 2,228,815 | Deerhake | Jan. 14, 1941 |
| 2,275,486 | Armstrong | Mar. 10, 1942 |
| 2,344,813 | Goldstine | Mar. 21, 1944 |
| 2,445,895 | Tyrrell | July 27, 1948 |
| 2,445,896 | Tyrrell | July 27, 1948 |
| 2,498,548 | Howard | Feb. 21, 1950 |
| 2,564,030 | Purcell | Aug. 14, 1951 |

OTHER REFERENCES

"Magic-Tee Waveguide Junction" by Saxon and Miller from Wireless Engineer, May 1948, pages 138–147. (Copy in 250—33.63.)